United States Patent
Ying et al.

(10) Patent No.: US 10,448,414 B2
(45) Date of Patent: Oct. 15, 2019

(54) DOWNLINK CONTROL CHANNEL FOR UPLINK ULTRA-RELIABLE AND LOW-LATENCY COMMUNICATIONS

(71) Applicants: Sharp Kabushiki Kaisha, Sakai-ku, Sakai, Osaka (JP); FG Innovation Company Limited, New Territories, Hong Kong (CN)

(72) Inventors: Kai Ying, Vancouver, WA (US); Tatsushi Aiba, Vancouver, WA (US); Toshizo Nogami, Vancouver, WA (US); John Michael Kowalski, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 16 days.

(21) Appl. No.: 15/928,695

(22) Filed: Mar. 22, 2018

(65) Prior Publication Data
US 2018/0279327 A1 Sep. 27, 2018

Related U.S. Application Data

(63) Continuation of application No. PCT/US2018/023582, filed on Mar. 21, 2018.
(Continued)

(51) Int. Cl.
*H04W 72/12* (2009.01)
*H04L 5/00* (2006.01)
*H04W 72/04* (2009.01)

(52) U.S. Cl.
CPC ........... *H04W 72/12* (2013.01); *H04L 5/0044* (2013.01); *H04L 5/0053* (2013.01);
(Continued)

(58) Field of Classification Search
None
See application file for complete search history.

(56) References Cited

U.S. PATENT DOCUMENTS

| 2013/0083739 A1 | 4/2013 | Yamada | |
| 2016/0192369 A1* | 6/2016 | Suzuki | H04L 1/1854 370/329 |
| 2017/0208590 A1* | 7/2017 | Kim | H04W 4/70 |

OTHER PUBLICATIONS

Nokia Siemens Networks, Nokia, "Configuration of periodic CQI reporting on PUSCH", 3GPP TSG RAN WG1 Meeting #52bis, Shenzhen, China, R1-081468 Apr. 4, 2008.
(Continued)

*Primary Examiner* — Hong S Cho
(74) *Attorney, Agent, or Firm* — Austin Rapp

(57) ABSTRACT

A user equipment (UE) is described. The UE includes receiving circuitry configured to receive a radio resource control message including first information used for indicating a periodicity. The receiving circuitry is also configured to receive on a physical downlink control channel (PDCCH), downlink control information (DCI) with CRC scrambled by a first Radio Network Temporary Identifier (RNTI), the DCI including information indicating a time domain resource. The UE also includes transmitting circuitry configured to perform, based on the DCI with CRC scrambled by the first RNTI, a transmission on a physical uplink shared channel (PUSCH) in a symbol. The time domain resource includes an index of the symbol in which the transmission on the PUSCH is performed and a slot offset value. The index of the symbol in which the transmission on the PUSCH is performed is within a slot given by the first information and the slot offset value.

6 Claims, 25 Drawing Sheets

Related U.S. Application Data

(60) Provisional application No. 62/475,766, filed on Mar. 23, 2017.

(52) U.S. Cl.
CPC ....... *H04L 5/0064* (2013.01); *H04W 72/0446* (2013.01); *H04L 5/001* (2013.01); *H04L 5/0051* (2013.01); *H04L 5/0055* (2013.01); *H04W 72/042* (2013.01)

(56) References Cited

OTHER PUBLICATIONS

Samsung, "Enhancements to UL Reference Signals for CoMP", 3GPP TSG RAN WG1 #70, Qingdao, China, R1-123479, Aug. 17, 2012.
International Search Report and Written Opinion issued for PCT Application No. PCT/US2018/023582 dated Jun. 29, 2018.
3GPP TR 38.913 v0.3.0, "Study on Scenarios and Requirements for Next Generation Access Technologies (Release 14)," Mar. 2016.
3GPP TR 22.862 v1.0.0, "Feasibility Study on New Services and Markets Technology Enablers Critical Communications; Stage 1 (Release 14)," Feb. 2016.
Huawei, HiSilicon, "Overview of URLLC support in NR", 3GPP TSG RAN WG1 meeting #86bis, Lisbon, Portugal, R1-1608843, Oct. 14, 2016.
"RAN1 Chairman's Notes," 3GPP TSG RAN WG1 Meeting #86bis, Lisbon, Portugal Oct. 14, 2016.
3GPP TS 36.331, V14.0.0, Evolved Universal Terrestrial Radio Access (E-UTRA); Radio Resource Control (RRC); Protocol specification (Release 14) Sep. 2016.
Samsung, "On grant-free UL transmissions for URLLC", 3GPP TSG RAN WG1 Meeting #88, Athens, Greece, R1-1702996, Feb. 17, 2017.
ZTE, ZTE Microelectronics, "Basic Grant-free Transmission for URLLC", 3GPP TSG RAN WG1 Meeting #88, Athens, Greece, R1-1701594, Feb. 17, 2017.
3GPP TS 36.321, V14.0.0, Evolved Universal Terrestrial Radio Access (E-UTRA); Medium Access Control (MAC); Protocol specification (Release 14) Sep. 2016.

* cited by examiner

DOWNLINK CONTROL CHANNEL FOR UPLINK ULTRA-RELIABLE AND LOW-LATENCY COMMUNICATIONS

RELATED APPLICATIONS

This application is related to and claims priority from U.S. Provisional Patent Application No. 62/475,766, entitled "DOWNLINK CONTROL CHANNEL FOR UPLINK ULTRA-RELIABLE AND LOW-LATENCY COMMUNICATIONS," filed on Mar. 23, 2017, which is hereby incorporated by reference herein, in its entirety.

TECHNICAL FIELD

The present disclosure relates generally to communication systems. More specifically, the present disclosure relates to downlink control channel for uplink ultra-reliable and low-latency communications (URLLC).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
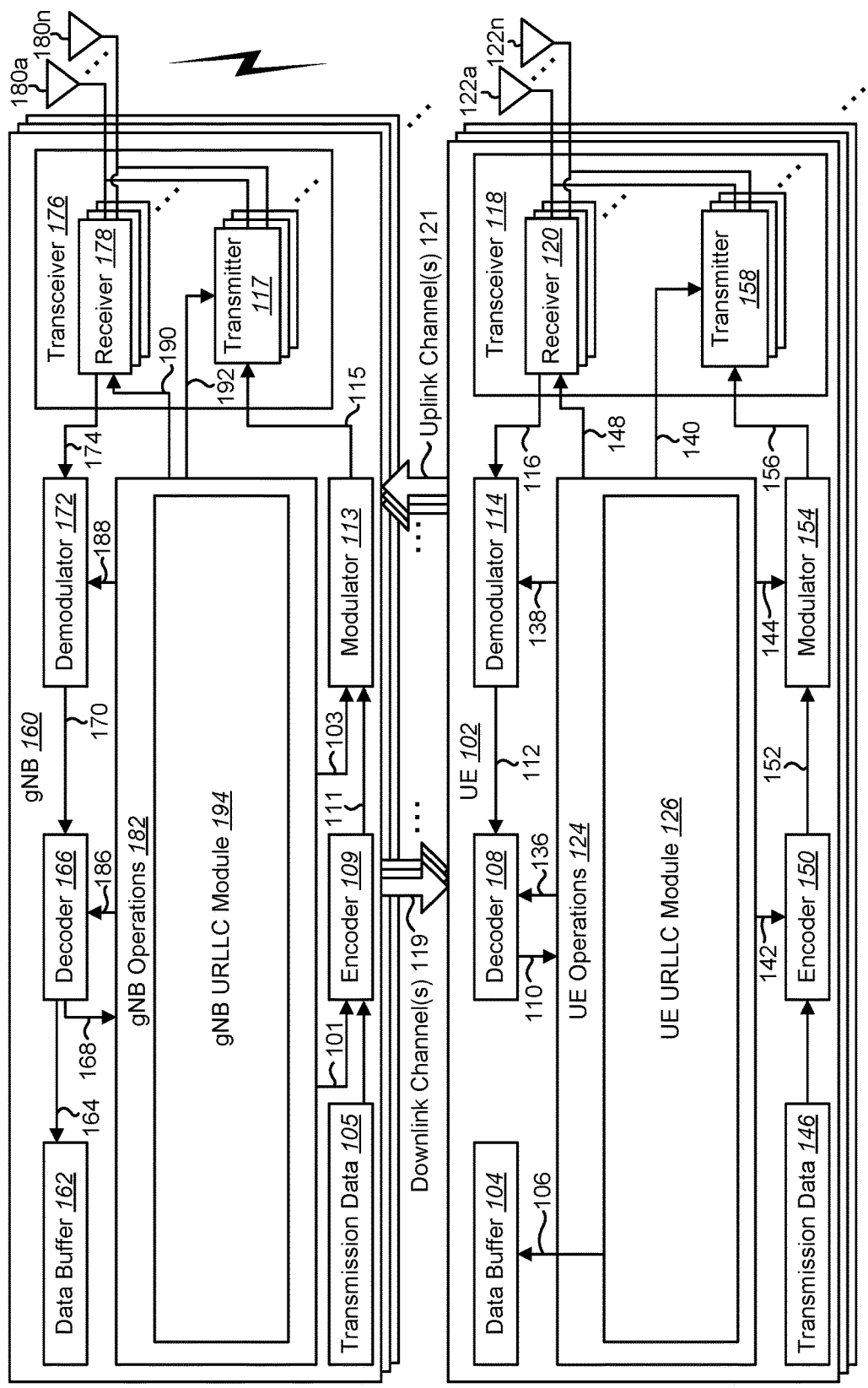
FIG. 1 is a block diagram illustrating one implementation of one or more base stations (gNBs) and one or more user equipments (UEs) in which systems and methods for ultra-reliable and low-latency communication operations may be implemented.

A user equipment (UE) is described. The UE includes receiving circuitry configured to receive a radio resource control message including first information used for indicating a periodicity. The receiving circuitry is also configured to receive on a physical downlink control channel (PDCCH), downlink control information (DCI) with CRC scrambled by a first Radio Network Temporary Identifier (RNTI), the DCI including information indicating a time domain resource. The UE also includes transmitting circuitry configured to perform, based on the DCI with CRC scrambled by the first RNTI and the first information, a transmission on a physical uplink shared channel (PUSCH) in a symbol. The time domain resource includes an index of the symbol in which the transmission on the PUSCH is performed and a slot offset value. The index of the symbol in which the transmission on the PUSCH is performed is within a slot given by the slot offset value.

The receiving circuitry may also be configured to receive a radio resource control message including a first parameter. The receiving circuitry may be further configured to receive a radio resource control message including a second parameter. The receiving circuitry may be additionally configured to receive on the PDCCH, DCI with CRC scrambled by a second RNTI, the DCI being used for scheduling of the PUSCH. The transmitting circuitry may also be configured to transmit a demodulation reference signal (DMRS) for the PUSCH. In a case that the transmission on the PUSCH is performed based on the DCI with CRC scrambled by the first RNTI and the first information, the DMRS for the PUSCH is generated based on the first parameter. In a case that a transmission on the PUSCH is performed based on the DCI with CRC scrambled by the second RNTI, the DMRS for the PUSCH is generated based on the second parameter.

Another UE that communicates with a base station apparatus is described. The UE includes receiving circuitry configured to receive a radio resource control message including first information used for indicating a periodicity. The receiving circuitry is also configured to receive a radio resource control message including second information used for indicating a slot offset value. The receiving circuitry is further configured to receive a radio resource control message including third information used for indicating an index of a symbol. The UE also includes transmitting circuitry configured to perform, based on the first information, the second information and the third information, a transmission on a PUSCH in the symbol. The index of the symbol in which the transmission on the PUSCH is performed is within a slot given by the first information and the second information.

A base station apparatus (gNB) that communicates with a user equipment is also described. The gNB includes transmitting circuitry configured to transmit a radio resource control message including first information used for indicating a periodicity. The transmitting circuitry is also configured to transmit on a PDCCH, DCI with CRC scrambled by a first RNTI, the DCI including information indicating a time domain resource. The gNB also includes receiving circuitry configured to perform, based on the DCI with CRC scrambled by the first RNTI and the first information, a reception on a PUSCH in a symbol. The time domain resource includes an index of the symbol in which the reception on the PUSCH is performed and a slot offset value. The index of the symbol in which the reception on the PUSCH is performed is within a slot given the slot offset value.

The transmitting circuitry may also be configured to transmit a radio resource control message including a first parameter. The transmitting circuitry may be further configured to transmit a radio resource control message including a second parameter. The transmitting circuitry may be additionally configured to transmit on the PDCCH, DCI with CRC scrambled by a second RNTI, the DCI being used for scheduling of the PUSCH. The receiving circuitry may be configured to receive a DMRS for the PUSCH. In a case that the reception on the PUSCH is performed based on the DCI with CRC scrambled by the first RNTI and the first information, the DMRS for the PUSCH is received based on the first parameter. In a case that a reception on the PUSCH is performed based on the DCI with CRC scrambled by the second RNTI, the DMRS for the PUSCH is received based on the second parameter.

Another gNB that communicates with a user equipment is described. The gNB includes transmitting circuitry configured to transmit a radio resource control message including first information used for indicating a periodicity. The transmitting circuitry is also configured to transmit a radio resource control message including second information used for indicating a slot offset value. The transmitting circuitry is further configured to transmit a radio resource control message including third information used for indicating an index of a symbol. The gNB also includes receiving circuitry configured to perform, based on the first information and the second information and the third information, a reception on a PUSCH in the symbol. The index of the symbol in which the reception on the PUSCH is performed is within a slot given by the first information and the second information.

A communication method of a UE that communicates with a gNB is also described. The method includes receiving a radio resource control message including first information used for indicating a periodicity. The method also includes receiving on a PDCCH, DCI with CRC scrambled by a first RNTI, the DCI including information indicating a time domain resource. The method further includes performing, based on the DCI with CRC scrambled by the first RNTI and the first information, a transmission on a PUSCH in a symbol. The time domain resource includes an index of the symbol in which the transmission on the PUSCH is performed and a slot offset value. The index of the symbol in which the transmission on the PUSCH is performed is within a slot given by the slot offset value.

The method may also include receiving a radio resource control message including a first parameter. The method may further include receiving a radio resource control message including a second parameter. The method may additionally include receiving on the PDCCH, DCI with CRC scrambled by a second RNTI, the DCI being used for scheduling of the PUSCH. The method may also include transmitting a DMRS for the PUSCH. In a case that the transmission on the PUSCH is performed based on the DCI with CRC scrambled by the first RNTI and the first information, the DMRS for the PUSCH is generated based on the first parameter. In a case that a transmission on the PUSCH is performed based on the DCI with CRC scrambled by the second RNTI, the DMRS for the PUSCH is generated based on the second parameter.

Another communication method of a UE that communicates with a gNB is described. The method includes receiving a radio resource control message including first information used for indicating a periodicity. The method also includes receiving a radio resource control message including second information used for indicating a slot offset value. The method further includes receiving a radio resource control message including third information used for indicating an index of a symbol. The method additionally includes performing, based on the first information and the second information and the third information, a transmission on a PUSCH in the symbol. The index of the symbol in which the transmission on the PUSCH is performed is within a slot given by the first information and the second information.

A communication method of a gNB that communicates with a UE is also described. The method includes transmitting a radio resource control message including first information used for indicating a periodicity. The method also includes transmitting on a PDCCH, DCI with CRC scrambled by a first RNTI, the DCI including information indicating a time domain resource. The method further includes performing, based on the DCI with CRC scrambled by the first RNTI and the first information, a reception on a PUSCH in a symbol. The time domain resource includes an index of the symbol in which the reception on the PUSCH is performed and a slot offset value. The index of the symbol in which the reception on the PUSCH is performed is within a slot given by the slot offset value.

The method may also include transmitting a radio resource control message including a first parameter. The method may further include transmitting a radio resource control message including a second parameter. The method may additionally include transmitting on the PDCCH, DCI with CRC scrambled by a second RNTI, the DCI being used for scheduling of the PUSCH. The method may also include receiving a DMRS for the PUSCH. In a case that the reception on the PUSCH is performed based on the DCI with CRC scrambled by the first RNTI and the first information, the DMRS for the PUSCH is received based on the first parameter. In a case that a reception on the PUSCH is performed based on the DCI with CRC scrambled by the second RNTI, the DMRS for the PUSCH is received based on the second parameter.

Another communication method of a gNB that communicates with a UE is described. The method includes transmitting a radio resource control message including first information used for indicating a periodicity. The method also includes transmitting a radio resource control message including second information used for indicating a slot offset value. The method further includes transmitting a radio resource control message including third information used for indicating an index of a symbol. The method additionally includes performing, based on the first information and the second information and the third information, a reception on a physical uplink shared channel (PUSCH) in the symbol. The index of the symbol in which the reception on the PUSCH is performed is within a slot given by the first information and the second information.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio", "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (mMTC) like services. A new radio base station may be referred to as a gNB. A gNB may also be more generally referred to as a base station device.

The systems and methods described herein teach approaches for URLLC transmission/retransmission management to meet the latency/reliability requirement. Some key requirements for URLLC relate to user (U)-plane latency and reliability. For URLLC, the target user plane latency is 0.5 milliseconds (ms) each way for both UL and DL. The target reliability is $1\text{-}10^{-5}$ for X bytes within 1 ms.

These URLLC-specific constraints make the hybrid automatic repeat request (HARQ) and retransmission mechanism design difficult. For example, the receiver must reply with a quick acknowledgement (ACK) or negative acknowledgement (NACK) or an uplink grant to meet the latency requirement, or the transmitter can retransmit immediately without waiting for ACK/NACK to enhance the reliability. On the other, grant-based or grant-free repetitions are supported to further enhance the reliability. How to terminate the repetitions is also an important issue. The described systems and methods teach URLLC HARQ/retransmission design in different cases.

The systems and methods described herein provide various cases in which PDCCH may be triggered. In a first case, PDCCH may be triggered when an eNB/gNB fails to decode the data but detects the UE ID. The eNB/gNB may send the PDCCH to that UE to grant a retransmission with/without repetition(s).

In a second case, PDCCH may be triggered when an eNB/gNB receives a (enhanced) buffer status report (BSR) for the subsequent data transmission. The eNB/gNB may use the PDCCH to grant a transmission with/without repetition(s).

In a third case, PDCCH may be triggered when an eNB/gNB receives information (e.g., power headroom, priority, numerology/transmission time interval (TTI) duration, etc.) for the subsequent data transmission through Medium Access Control (MAC) control element (CE). The eNB/gNB may use the PDCCH to grant a transmission with/without repetition(s).

In a fourth case, PDCCH may be triggered when an eNB/gNB receives a (enhanced) scheduling request from a UE. The eNB/gNB may send the PDCCH to that UE to grant a transmission with/without repetition(s).

In a fifth case, PDCCH may be triggered when an eNB/gNB decodes a TB successfully. The eNB/gNB may send the PDCCH to that UE to acknowledge a successful transmission and/or to terminate repetitions of the same TB.

In a sixth case, PDCCH may be triggered when some information (e.g., buffer size, power headroom, priority, numerology/TTI duration, etc.) related to the data transmission is multiplexed with the data in Layer 1, and the eNB/gNB fails to decode the data but detects the related information and knows the UE ID. The eNB/gNB may send the PDCCH to that UE to grant a retransmission.

The systems and methods described herein also detail the content of the PDCCH. Downlink control information (DCI) carried by the PDCCH may include at least one of the following. The DCI carried by the PDCCH may include the number of PUSCH repetitions. The set of numbers may be configured by higher layer (e.g., RRC). The DCI may use some bits to indicate the choice for the repetitions.

The DCI carried by the PDCCH may include resource information (i.e., resource allocation). In an implementation, a resource indicator may be in the frequency domain (e.g., a resource-block indicator). In another implementation, a resource indicator may be in the time domain. In one approach of the time domain resource indicator, a subframe/slot/mini-slot/OFDM symbol (OS) index/offset may be used. In a second approach of the time domain resource indicator, the start position of subframe/slot/mini-slot/OS may be derived from the timing of the PDCCH, where the timing relationship between the PDCCH and the corresponding time domain resource is configured. In a third approach of the time domain resource indicator, the subframe index of the preconfigured resource may be determined by RRC configuration while the mini-slot index/offset may be determined by SPS activation or dynamically allocated by the DCI grant.

In another approach of the time domain resource indicator, a mini-slot/OS bitmap may be used. A bitmap can help avoid some significant parts or severe contention.

The DCI carried by the PDCCH may include a frequency-hopping flag. A hopping pattern can be configured by higher layer and the flag may be used to trigger the frequency-hopping or not.

The DCI carried by the PDCCH may include a HARQ process number. The number of indication bits may be determined by the number of HARQ process supported for UL URLLC transmission, which may be specified in specification.

The DCI carried by the PDCCH may include one or more of a MCS, RV, and/or new data indicator.

The DCI carried by the PDCCH may include a number of PDCCH repetitions. To enhance the reliability of the control information, repetitions may also be necessary for PDCCH.

The DCI carried by the PDCCH may include a timing for uplink scheduling grant. A scheduling PDCCH ending in a downlink time unit (e.g., subframe, slot, mini-slot, OS) index n is valid for an uplink PUSCH transmission starting in an uplink time unit (e.g., subframe, slot, mini-slot, OS) index n+k. In a case that multiple timings are supported for UL URLLC, k will dynamically indicated by DCI. The set of k values can be configured by higher layer (e.g., RRC). The DCI uses some bits to indicate the choice for the timing value k.

The DCI carried by the PDCCH may include a flag for subframe/slot/mini-slot/OS differentiation. The uplink grant can be subframe-based, slot-based, mini-slot-based or OS-based. A flag is used to differentiate the formats.

The systems and methods described herein also detail what the PDCCH triggers. After receiving the PDCCH, the UE may stop repetition(s) of the same TB at the configured resource(s).

After receiving the PDCCH, the UE may start grant-based retransmission(s) of the same TB. The resource(s) of the grant-based retransmission(s) can override the configured resource(s) for repetition(s).

After receiving the PDCCH, the UE may start grant-based retransmission(s) of the same TB at different resource(s) without stopping the configured repetition(s). Alternatively, after receiving the PDCCH, the UE may start grant-based retransmission(s) of the same TB at different resource(s) with stopping the configured repetition(s).

The PDCCH may indicate a positive acknowledgement of a successful transmission. The PDCCH may indicate a negative acknowledgement of a transmission.

After receiving the PDCCH, the UE may start grant-based transmission(s) of a new TB. The resource(s) of the grant-based transmission(s) can override the configured resource(s) for repetition(s) of the previous TB.

After receiving the PDCCH, the UE may start grant-based transmission(s) of a new TB at different resource(s) without stopping the configured repetition(s) of the previous TB. After receiving the PDCCH, the UE starts grant-based transmission(s) of a new TB at different resource(s) with stopping the configured repetition(s) of the previous TB. Additionally, the PDCCH may trigger any combination of above.

The systems and methods described herein also detail the timing between the uplink transmission and the triggered PDCCH. The timing can be subframe-based, slot-based, mini-slot-based or OS-based. The format (e.g. timing granularity) can be configured by higher layer or dynamically changed by DCI. In an approach, the timing is fixed by specification. In another approach, the timing is indicated by a field in activation from a set of values and the set of values is configured by higher layer. In yet another approach, the time (e.g., periodicity, offset) and frequency (e.g., RB) resource may be configured by higher layer and the UE monitors PDCCH at the configured resource.

The systems and methods described herein also detail the timing between the PDCCH and the corresponding UL transmission. The timing can be subframe-based, slot-based, mini-slot-based or OS-based. The format (e.g. timing granularity) can be configured by higher layer or dynamically changed by DCI. In an approach, the timing is fixed by specification. In another approach, the timing is indicated by a field in the DCI from a set of values and the set of values is configured by higher layer. In yet an approach, the timing can be any value indicated by the DCI. In a case that timing is fixed, a UE to transmit in timing n is not expected to receive the PDCCH in the timing other than timing n−k, which k is pre-defined value.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for ultra-reliable and low-latency communication operations may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., different Physical Uplink Shared Channel from PUSCH) may be defined for transmitting the URLLC data. The URLLC-PUSCH described herein is assumed to be included in the PUSCH for the sake of simple description.

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE URLLC module 126.

The UE URLLC module 126 may perform URLLC operations. URLLC operations may include grant-free data transmission (UL transmission without detection of downlink control information for triggering), sub-slot (sub-slot may be also referred to as mini-slot) based data transmission, SR triggered data transmission (SR is sent before data transmission), SR-less data transmission (SR is not used), etc.

For URLLC UL transmission schemes (including repetition), at least semi-static resource (re-)configuration may be supported. For semi-static resource allocation (also referred to as semi-persistent scheduling (SPS)), there are several basic procedures: radio resource control (RRC) configuration (e.g., a RRC message, a RRC signal), activation, UL transmission and deactivation. The RRC configuration may be exchanged between the gNB 160 and the UE 102 through a RRC layer. The RRC signal may be included in a higher layer signal. At the beginning, the gNB 160 should allocate an SPS resource (e.g., period, a Physical Resource Block (PRB) index of SPS resource) and function to a specific UE 102 by SPS-Config, which is shown in the SPS-Config information element of Listing-1.

| Listing-1 |
|---|

```
-- ASN1START
SPS-Config ::= SEQUENCE {
   semiPersistSchedC-RNTI       C-RNTI         OPTIONAL, -- Need OR
   sps-ConfigDL                 SPS-ConfigDL   OPTIONAL, -- Need ON
   sps-ConfigUL                 SPS-ConfigUL   OPTIONAL -- Need ON
}
SPS-ConfigDL ::= CHOICE{
   release                      NULL,
   setup                        SEQUENCE {
      semiPersistSchedIntervalDL    ENUMERATED {
                                    sf10, sf20, sf32, sf40, sf64, sf80,
                                    sf128, sf160, sf320, sf640, spare6,
                                    spare5, spare4, spare3, spare2,
                                    spare1},
      numberOfConfSPS-Processes     INTEGER (1..8),
      n1PUCCH-AN-PersistentList     N1PUCCH-AN-PersistentList,
      ...,
      [[ twoAntennaPortActivated-r10  CHOICE {
          release                   NULL,
          setup                     SEQUENCE {
             n1PUCCH-AN-PersistentListP1-r10   N1PUCCH-AN-
PersistentList
          }
      }
      OPTIONAL -- Need ON
      ]]
   }
}
SPS-ConfigUL ::= CHOICE {
   release                      NULL,
   setup                        SEQUENCE {
      semiPersistSchedIntervalUL    ENUMERATED {-- Period of UL SPS
                                    sf10, sf20, sf32, sf40, sf64, sf80,
                                    sf128, sf160, sf320, sf640, sf1-v14xy,
                                    sf2-v14xy, sf3-v14xy, sf4-v14xy,
                                    sf5-v14xy, spare1},
      implicitReleaseAfter          ENUMERATED {e2, e3, e4, e8},
      p0-Persistent                 SEQUENCE {
         p0-NominalPUSCH-Persistent    INTEGER (-126..24),
         p0-UE-PUSCH-Persistent        INTEGER (-8..7)
      } OPTIONAL,                                         -- Need OP
      twoIntervalsConfig            ENUMERATED {true}
      OPTIONAL, -- Cond TDD
      ...,
      [[ p0-PersistentSubframeSet2-r12   CHOICE {
          release                   NULL,
          setup                     SEQUENCE {
             p0-NominalPUSCH-PersistentSubframeSet2-r12
INTEGER (-126..24),
             p0-UE-PUSCH-PersistentSubframeSet2-r12
INTEGER (-8..7)
          }
      }                             OPTIONAL -- Need ON
      ]],
      [[ numberOfConfUlSPS-Processes-r13   INTEGER (1..8)
      OPTIONAL   -- Need OR
      ]]
   }
}
N1PUCCH-AN-PersistentList ::=   SEQUENCE (SIZE (1..4)) OF INTEGER
(0..2047)
-- ASN1STOP
```

Here, the SPS resource may include (correspond to) an UL resource, a frequency resource, UL-SCH resource, and/or PUSCH resource. Also, the gNB 160 may allocate SPS resource, which is shown in the URLLC-Config information element of Listing-2. Here, for example, the gNB 160 may configure a periodicity (e.g., a time resource) by using the RRC signal, and indicate a SPS resource (e.g., a frequency resource) by using a DCI format.

In the example of Listing-2, the timing is subframe based and the minimum period is 10 subframes. For URLLC, the period can be much shorter. For example, the period can be 8, 6, 4, 2 or even 1 time unit(s) and the time unit can be slot/mini-slot/OS based as well as subframe based. In a case that asynchronous HARQ is supported for UL URLLC, the number of HARQ process may be configured by using the RRC signal, which is shown in Listing-2 as an example. Also, the C-RNTI may be a unique identification used for identifying a RRC connection and scheduling. For example, the C-RNTI may be used for dynamically scheduled transmission (e.g., dynamically scheduled unicast transmission). The SPS C-RNTI may be a unique identification used for semi-persistent scheduling for PUSCH transmission (e.g., the first UL-SCH transmission, and/or the first PUSCH transmission). For example, the SPS C-RNTI may be used for semi-persistently scheduled transmission (e.g., semi-persistently scheduled unicast transmission). The URLLC C-RNTI may be a unique identification used for semi-persistent scheduling for URLLC transmission (e.g., the second UL-SCH transmission, and/or the second PUSCH transmission). For example, the URLLC C-RNTI may be used for semi-persistently scheduled transmission (e.g., semi-persistently scheduled unicast transmission). The dynamically scheduled transmission and/or the semi-persistently scheduled transmission herein is assumed to be included in the UL transmission for the sake of simple description.

In an example, CRC (Cyclic Redundancy Check) parity bits may be attached to the DCI (e.g., PDCCH), and scrambled by the C-RNTI, the SPS C-RNTI, and/or the URLLC-RNTI. Namely, the UE 102 may monitor (attempt to decode) the DCI to which the CRC parity bits scrambled by the C-RNTI, the SPS C-RNTI, and/or the URLLC C-RNTI are attached. Namely, the UE 102 may monitor the DCI (i.e., PDCCH) with the C-RNTI, the SPS C-RNTI, and/or the URLLC C-RNTI.

activating and/or deactivating UL transmission as mentioned above. The DCI may contain a flag for subframe/slot/mini-slot/OS differentiation.

In an implementation, the gNB 160 may transmit a multiple-step configuration. At a first step (Step 1), the gNB 160 may transmit a configuration based on coarse granularity (e.g., subframe based, slot based). At a second step (Step 2), the gNB 160 may indicate a detailed configuration within the configuration in Step 1 based on fine granularity (e.g., mini-slot based, OFDM symbol based). Also, the gNB 160 may transmit coarse resource configuration (e.g., subframe/slot period and offset/index) by using the RRC signal and may indicate fine resource configuration within the coarse resource configuration (e.g., mini-slot/OS index/offset or mini-slot/OS bitmap within the configured subframe/slot). In these cases, the DCI format may be the DCI format used for activating and/or deactivating UL transmission as mentioned above. There may be multiple configured fine units in a configured coarse unit. For example, in a configure slot, there may be 1 or more mini-slots configured for UL URLLC transmission. When mini-slot/OS index/offset or Listing-2

```
-- ASN1START
URLLC-Config ::= SEQUENCE {
   URLLCSchedC-RNTI         C-RNTI (or URLLC C-RNTI)
   OPTIONAL,                -- Need OR
   URLLC-ConfigUL           URLLC-ConfigUL      OPTIONAL
}
URLLC-ConfigUL ::= CHOICE {
   release                  NULL,
   setup                    SEQUENCE {
      URLLCInterval         ENUMERATED {-- Period of UL SPS
                                sf10, sf20, sf32, sf40, sf64, sf80,
                                sf128, sf160, sf320, sf640},
      numberOfConfURLLC-Processes              INTEGER (1..8),
      implicitReleaseAfter (or URLLC-Timer)    ENUMERATED {e2, e3, e4, e8},
      p0-URLLC              SEQUENCE {
         p0-NominalPUSCH-URLLC                 INTEGER (-126..24),
         p0-UE-PUSCH-URLLC                     INTEGER (-8..7)
      }                     OPTIONAL,          -- Need OP
N1PUCCH-AN-PersistentList ::=  SEQUENCE (SIZE (1..4)) OF INTEGER
(0..2047)
-- ASN1STOP
```

In an implementation, the gNB 160 may transmit multiple configurations (e.g., multiple periodicities and multiple SPS resources) by using the RRC signal and may indicate one configuration (e.g., one periodicity and one SPS resource) by using the DCI format. Also, the gNB 160 may transmit multiple periodicities by using the RRC signal and indicate one periodicity and one SPS resource by using the DCI format. In these cases, the DCI format may be the DCI format used for activating and/or deactivating UL transmission as mentioned above.

In an implementation, the gNB 160 may transmit multiple configurations based on multiple granularities (e.g., subframe-based, slot-based, mini-slot-based, OFDM symbol (OS)-based) by using the RRC signal and may indicate one configuration (e.g., one granularity and one SPS resource) by using a DCI format. Thus, parameters (e.g., period, index or offset) in Listing-1 and Listing-2 may be slot-based, mini-slot-based, OS-based as well as subframe based.

In an implementation, the gNB 160 may transmit multiple granularities by using the RRC signal and may indicate one granularities and one SPS resource by using DCI format. In these cases, the DCI format may be the DCI format used for mini-slot/OS bitmap is used for configuration, some important parts (e.g., control or reference signal (RS)) may be avoided.

Namely, the gNB 160 may configure, by using the RRC signal, the periodicity (i.e., the interval) of the subframe(s) and/or the slot(s). For example, the gNB 160 may configure 'sf1', 'sf2', and/or 'sf5' as the periodicity of the subframe(s) and/or the slot(s). Here, the value 'sf1' may correspond to 1 subframe(s) (e.g., 1 ms) and/or 1 slot(s) (e.g., 0.5 ms). Also, the value 'sf2' may correspond to 2 subframe(s) (e.g., 2 ms) and/or 2 slot(s) (e.g., 1 ms). Also, the value 'sf5' may correspond to 5 subframe(s) (e.g., 5 ms) and/or 5 slot(s) (e.g., 2.5 ms). Also, gNB 160 may indicate, by using the DCI, UL resource (i.e., a PUSCH resource, resource block index, SPS resource, and/or a frequency resource). As described above, the DCI (e.g., UL grant) may be used for the activation and/or the deactivation of the UL transmission (e.g., URLLC transmission) on the UL resource (e.g., the UL resource may be indicated by the DCI). Here, the DCI may include information indicating an index of the slot (s), mini-slot(s), and/or the OS(s). Namely, the DCI may include information indicating a timing (e.g., an offset value, a time resource) for the UL transmission (i.e., the UL-SCH transmission, the PUSCH transmission) on the UL resources. For example, the gNB 160 may indicate 'index2' as the index of the slot(s), mini-slot(s), and the OS(s). Here, the value 'index2' may correspond to the second slot, the second mini-slot, and/or the second OS within a subframe and/or a slot (i.e., a particular subframe and/or a particular slot). Also, for example, the gNB 160 may indicate 'offset2' as the offset of the slot(s), mini-slot(s), and the OS(s). Here, the value 'offset2' may correspond to the offset value '2' from the beginning of a subframe and/or a slot (i.e., a particular subframe and/or a particular slot). And, the subframe and/or the slot (i.e., the particular subframe and/or the particular slot) may be determined based on the periodicity configured.

For example, the UE 102 may determine, based on the periodicity (i.e., information related to the periodicity) and the information included in the DCI, a timing of the UL transmission on the UL resource. In a case that the value 'sf2' is configured as the periodicity of the subframe(s) (and/or the periodicity of the slot(s)) and the value 'index2' is indicated as the index of the mini-slot (and/or the index of the OS), the UE 102 may perform, in the index of the mini-slot '2' (and/or the index of the OS '2') and with the periodicity of 2 subframe(s) (and/or the periodicity of 2 slot(s)), the UL transmission on the UL resources. Namely, the UL transmission may be performed in the index of the mini-slot '2' (and/or the OS '2') within a subframe (e.g., a first subframe). Also, the periodicity of the subframe (i.e., the first subframe, the UL transmission) may be 2 subframe(s) (and/or 2 slot(s)). Also, for example, in a case that the value 'sf5' is configured as the periodicity of the slot(s) and the value 'offset2' is indicated as the offset of the mini-slot (and/or the offset of the OS), the UE 102 may perform, in a mini-slot (and/or a OS) which is offset '2' from the beginning of a slot and with the periodicity of 5 slot(s), the UL transmission on the UL resources. Namely, the UL transmission may be performed in the mini-slot (and/or the OS) which is offset '2' from the beginning of a slot (e.g., a first slot). Also, the periodicity of the slot (e.g., the first slot, the UL transmission) may be 5 slot(s).

The UE 102 may consider that the DCI (e.g., UL grant, UL grant used for the activation and/or the deactivation) occurs in the timing(s) determined based on the periodicity and the information included in the DCI (e.g., UL grant, UL grant used for the activation and/or the deactivation). For example, the UE 102 may store the DCI as the configured grant. And, the UE 102 may consider that the configured grant occurs in the timing(s) determined based on the periodicity and the information included in the DCI. For example, for K times of the UL transmission (e.g., K repetitions described below), the UE 102 may consider (e.g., consider sequentially) that the configured grant (e.g., K times of the configured grant) occurs in the timing(s) (i.e., each of the timings) determined based on the periodicity and the information included in the DCI. Namely, the UE 102 may consider (e.g., consider sequentially) that the configured grant occurs K times in the timing (s) (i.e., each of the timings) determined based on the periodicity and the information included in the DCI.

The K repetitions including initial transmission (K>=1) for the same TB may be supported for UL URLLC transmission. The gNB 160 may configure one or more repetition numbers (i.e., one or more values of K) by using the RRC signal. Also, the gNB 160 may configure multiple repetition numbers (i.e., multiple values of K) by using the RRC signal and may indicate one value of repetition number K among the multiple repetition numbers by using DCI format. Also, the gNB 160 may transmit a fixed repetition number by using the RRC signal or dynamically indicate the repetition number by using DCI format. In these cases, the DCI format may be the DCI format used for activating and/or deactivating UL transmission as mentioned above.

In a case that a hopping mechanism is used. The gNB 160 may transmit multiple hopping patterns by using the RRC signal. When the UE 102 receives the DCI indicating the resource for the first UL transmission and repetition number K, the UE 102 may implicitly know the hopping pattern for the following repetition(s). Alternatively, the gNB 160 may indicate one hopping pattern from the set of configured hopping patterns explicitly by using the DCI format. In these cases, the DCI format may be the DCI format used for activating and/or deactivating UL transmission as mentioned above.

For URLLC uplink transmission/repetition without grant, the UE 102 may transmit at a configured resource without receiving the grant. For contention-free UL transmission, the configured resource may be dedicated to the UE 102. The gNB 160 may know the UE ID implicitly by detecting the transmission at the configured resource. Also, the gNB 160 may identify a UE 102 by detecting a UE-specific preamble or demodulation reference signal (DMRS).

For contention-based UL transmission, the configured resource may be shared by multiple UEs 102. Each UE 102 may be allocated a specific preamble (e.g., cyclic shift or root sequence) or DMRS (e.g., Demodulation Reference Signal(s) associated with transmission of PUSCH). The gNB 160 may identify a UE 102 by detecting UE-specific preamble or DMRS. For example, the gNB 160 may transmit the RRC signal including a first parameter (e.g., a value of the first parameter) related to a base sequence of DMRS (e.g., a generation of the base sequence of the DMRS). The first parameter may be related to PUSCH DMRS sequence (e.g., a generation of the PUSCH DMRS sequence). Also, the first parameter may be related to the UE ID (e.g., UE Identification). Also, the gNB 160 may transmit the RRC signal including a second parameter (e.g., a value of the second parameter) related to a base sequence of DMRS. The second parameter may be related to PUSCH DMRS sequence. Also, the second parameter may be related to Cell ID (e.g., Cell Identification, Virtual Cell ID). For example, in a case that the UL transmission (e.g., the semi-persistently scheduled transmission, the UL transmission scheduled by using the DCI (i.e. PDCCH) with the SPS C-RNTI, and/or the URLLC C-RNTI) is performed, the UE may generate, based on the value of the first parameter, the base sequence of the DMRS. Also, in a case that the UL transmission (e.g., the semi-persistently scheduled transmission, the UL transmission scheduled by using the DCI (i.e. PDCCH) with the SPS C-RNTI, and/or the URLLC C-RNTI) is performed, the UE 102 may generate, based on the value of the first parameter, the PUSCH DMRS sequence. Also, for example, in a case that the UL transmission (e.g., the dynamically scheduled transmission, the UL transmission scheduled by using the DCI (i.e., PDCCH) with C-RNTI) is performed, the UE 102 may generate, based on the value of the second parameter, the base sequence of the DMRS. Also, for example, in a case that the UL transmission (e.g., the dynamically scheduled transmission, the UL transmission scheduled by using the DCI (i.e., PDCCH) with C-RNTI) is performed, the UE 102 may generate, based on the value of the second parameter, the PUSCH DMRS sequence.

The gNB 160 may fail to decode the UL data but detect the UE ID successfully. In this case, the gNB 160 may grant a retransmission/repetition(s) of the same TB by using the PDCCH.

In a special design, some related parameters (e.g., buffer size, power headroom, priority, numerology/TTI duration, repetition number, hopping pattern, MCS, etc.) may be multiplexed with UL data in Layer 1. The gNB 160 may fail to decode the UL data but may detect the UE ID and related parameter(s) successfully. In this case, with the knowledge of related parameter(s), the gNB 160 may grant a retransmission/repetition(s) of the same TB by using the PDCCH.

The UL transmission/repetition(s) on the UL resources may contain buffer status report (BSR) for the subsequent transmission(s). After receiving the BSR, the gNB 160 may grant a transmission/repetition(s) of the new TB by using the PDCCH.

Also, the UL transmission/repetition(s) on the UL resources may contain a power headroom report for the subsequent transmission(s). After receiving the power headroom report, the gNB 160 may grant a transmission/repetition(s) of the new TB by using the PDCCH.

Also, the UL transmission/repetition(s) on the UL resources may contain MAC control elements indicating other parameter report(s) (e.g., priority, numerology/TTI duration, repetition number, hopping pattern, MCS, etc.) for the subsequent transmission(s). After receiving the report(s), the gNB 160 may grant a transmission/repetition(s) of the new TB by using the PDCCH.

In a case that multiple MAC control elements including newly introduced MAC control elements are supported for UL URLLC transmission/repetition(s), MAC multiplexing and logical channel prioritization are done.

The UE 102 may transmit a (enhanced) scheduling request (SR) before UL URLLC data transmission. It can be a single-bit SR or a multi-bits SR indicating additional information (e.g., buffer size, power headroom, priority, numerology/TTI duration, repetition number, hopping pattern, MCS, etc.). After receiving the SR, the gNB 160 may grant a transmission/repetition(s) corresponding to the SR by using the PDCCH.

After decoding an UL URLLC transmission successfully, the gNB 160 may send out a positive acknowledgement by using the DCI (i.e., the PDCCH).

The PDCCH mentioned above may carry downlink control information (DCI) indicating transmission of the same TB or a new TB. Namely, the gNB 160 may indicate, by using the DCI (e.g., the DCI (i.e., PDCCH) with the C-RNTI), the transmission of the same TB (e.g., the first TB) for the K repetitions (e.g., K repetitions of the UL transmission) of the first TB. Namely, the gNB 160 may indicate, by using the DCI (e.g., the DCI (i.e., PDCCH) with the C-RNTI), the transmission of the first TB during the K repetitions of the first TB. Here, the UE 102 may stop the repetition of the first TB in a case that the DCI indicating the transmission of the first TB is received. Namely, the UE 102 may continue the repetition of the first TB unless the DCI indicating the transmission of the first TB is received. Also, the gNB 160 may indicate, by using the DCI, (e.g., the DCI (i.e., PDCCH) with the C-RNTI), the transmission of the different TB (e.g., the second TB) for the K repetitions (e.g., K repetitions of the UL transmission) of the first TB. Namely, the gNB 160 may indicate, by using the DCI (e.g., the DCI (i.e., PDCCH) with the C-RNTI), the transmission of the second TB during the K repetitions of the first TB.

Here, the UE 102 may continue the repetition of the first TB unless the DCI indicating the transmission of the second TB is received. For example, an additional bit(s) (e.g., new data indicator) included in the DCI may be used to indicate whether it is for the same TB or a new TB. Namely, information (e.g., information bit(s) field) included in the DCI may be used for indicating the transmission of the same TB. Also, information (e.g., information bit(s) field) included in the DCI may be used for indicating the transmission of the different TB. Also, some information bit(s) field(s) included in the DCI may be set to default value(s) (i.e., predetermined value(s)) to indicate whether it is for the same TB or a new TB. For example, each of one or more information fields (e.g., one or more information field mapped to the DCI) may be set to each of one or more predetermined values. Namely, in a case that the each of the one or more information fields is set to each of one or more predetermined values, the transmission of the same TB (i.e., the first TB) or the different TB (i.e., the second TB) may be indicated. Here, each of the one or more information fields and each of the one or more predetermined values may be defined in advance by the specification, and may be known information between the gNB 160 and the UE 102.

Additionally and/or alternatively, the gNB 160 may configure an identifier of HARQ process (HARQ process ID, an index of HARQ process, a number of HARQ process) by using the RRC signal. Here, a HARQ process may be associated with a HARQ process. Also, a HARQ process may be associated with a given transmission time interval (e.g., an UL transmission, an interval for an UL transmission, a duration for an UL transmission). Also, a HARQ process may be associated with a TB. For example, the gNB 160 may configure the HARQ process ID used for the UL transmission (dynamically scheduled transmission and/or semi-persistently scheduled transmission). For example, the gNB 160 may configure '1' as the HARQ process ID, and the UE 102 may perform an URLLC initial transmission of and/or a URLLC retransmission based on the HARQ ID '1'. For example, the UE 102 may transmit a TB associated with the HARQ ID in the URLLC initial transmission and/or the URLLC retransmission. For example, the UE 102 may perform the K repetitions of a TB (i.e., the first TB) associated with the HARQ process ID '1' configured.

Also, the gNB 160 may indicate an HARQ ID by using the DCI (e.g., the DCI (i.e., PDCCH) with the C-RNTI, the DCI (i.e., the PDCCH) with the SPS C-RNTI, and the DCI (i.e., the PDCCH) with the URLLC C-RNTI). For example, the gNB 160 may indicate '1' as the HARQ process ID, and the UE 102 may perform the UL transmission (e.g., initial transmission and/or retransmission) based on the HARQ ID '1'. For example, the UE 102 may transmit the TB (i.e., the first TB) associated with the HARQ process ID '1' indicated by using the DCI. Also, the UE 102 may transmit a TB (i.e., the second TB) associated with the HARQ process ID '2' indicated by using the DCI. And, the HARQ process ID may be used for identifying the same TB (i.e., the first TB) or the different TB (i.e., the second TB). For example, in a case that the UE 102 is configured with '1' as the HARQ process ID (e.g., for URLLC transmission of a TB (i.e., the first TB), and/or for K repetitions of the UL transmission of a TB (i.e., the first TB)), the UE 102 may stop the K repetitions in a case that the DCI indicating the HARQ process ID '1' (i.e., the HARQ process ID associated with the TB (i.e., the first TB)) is received. Also, in a case that the UE 102 is configured with '1' as the HARQ process ID (e.g., for URLLC transmission of a TB (i.e., the first TB), and/or for K repetitions of the UL transmission of a TB (i.e., the first TB)), the UE 102 may perform the UL transmission (e.g., the UL transmission of the TB (i.e., the second TB), dynamically scheduled transmission of the TB (i.e., the second TB)) in a case that the DCI indicating the HARQ process ID '2' (i.e., the HARQ process ID associated with the different TB (e.g., the second TB)) is received. And, the UE 102 may continue the K repetitions unless that the DCI indicating the HARQ process ID '1' is received.

As described above, the UE 102 may stop the repetition of the TB (e.g., the first TB) in a case that the DCI indicating the transmission of the same TB (e.g., the first TB) is received. Here, the DCI (e.g., the DCI with the C-RNTI) may be used for scheduling of PUSCH in a subframe, in a slot, a mini-slot, and/or an OS. Namely, the dynamically scheduled transmission may be performed in a subframe level, in a slot level, in a mini-slot level, and/or in an OS level. Also, the URLLC transmission (i.e., the semi-persistently scheduled transmission, the transmission scheduled by using the DCI with the SPS C-RNTI, and/or the URLLC C-RNTI) may be performed in a subframe level, in a slot level, in a mini-slot level, and/or in an OS level. Therefore, for example, the UE 102 may stop the repetition of the TB after a duration (e.g., a length of time, a length of interval) in a case that DCI indicating the transmission of the same TB is received. For example, the UE 102 may stop the repetition of the TB in a subframe 'n+1' (and/or in a slot 'm+1', and/or in a mini-slot 't+1', and/or in an OS 's+1') in a case that the DCI indicating the transmission is the same TB is received in a subframe 'n' (and/or in a slot 'm', and/or in a mini-slot 't', and/or an OS 's'). Also, the gNB 160 may configure the duration (e.g., by using the RRC signal). The UE 102 may stop the repetition of the TB after the duration configured in a case that DCI indicating the transmission of the same TB is received.

As described above, the DCI (e.g., the DCI (i.e., the PDCCH) with the C-RNTI) may indicate Dynamic Scheduling resource (also referred to as DS resource) for the dynamically scheduled transmission. Here, the DS resource may include (correspond to) an UL resource, a frequency resource, an UL-SCH resource, and/or a PUSCH resource. The DS resource may use a different resource comparing to configured resource for UL URLLC transmission(s). Or, the DS resource may override the configured resource for UL URLLC transmission(s). Or the DS resource may use the same resource as the configured resource for UL URLLC transmission(s). Time/frequency resource may be included in the DCI format.

Also, the DCI may indicate some related parameters (e.g., priority, numerology/TTI duration, repetition number, hopping flag, hopping pattern, MCS, RV, flag for subframe/slot/mini-slot/OS differentiation, HARQ process number, etc.) for the granted transmission(s)/retransmission(s).

Also, the DCI may indicate a successful UL transmission. Some field(s) in the DCI format may be set to default value(s) to indicate whether it is a successful UL transmission. Alternatively, a different DCI may be used to indicate a positive or negative acknowledgement of the UL transmission.

Also, as described above, for a UE 102 configured with K repetitions for URLLC UL transmission, before the K repetitions of a TB at the configured resource are finished, the UE 102 may receive the PDCCH indicating a UL grant for the same TB (i.e. the DCI indicating the transmission of the same TB), and/or a UL grant for a new TB (i.e., the DCI indicating the transmission of the different TB), and/or a positive acknowledgement. Then, the UE 102 may stop the current repetitions. In a case that the PDCCH indicating the transmission of the same TB, the UE 102 may follow the UL grant (i.e., stop the K repetitions of the UL transmission) and start granted-based transmission/retransmission. The granted-based transmission/retransmission may override the configured resource for repetitions. (i.e., the K repetitions of the UL transmission). For example, the UE 102 may perform, based on a detection of the UL grant in a subframe 'n' (or in a slot 'm', in a mini-slot 't', and/or in a OS 's'), the UL transmission in subframe n+k (or in a slot 'm+1', in a mini-slot 't+p', and/or in a OS 's+q'). Here, the value of 'k', 'l', 'p', and/or 'q' may be defined in advance by specification. Also, the value of 'k', 'l', 'p', and/or 'q' may be configured by using the RRC signal and/or the DCI (from the gNB 160 to the UE 102). Here, this DCI (i.e., UL grant) may be a DCI (i.e., UL grant) with the C-RNTI. Namely, this DCI may be used for scheduling of dynamically scheduled transmission.

As described above, in a case that the DCI indicating the transmission of the same TB is received, the UE 102 may follow the DCI (e.g., the DCI with the C-RNTI, the DCI indicating the transmission of the same TB). Namely, in a case that the UE 102 may perform the UL transmission on the first UL resources (e.g., the first PUSCH resources), the UE 102 may perform the UL transmission on the second UL resources if the DCI (i.e., the DCI indicating the transmission of the same TB) scheduling the second UL resources (e.g., the second PUSCH resources) is received. Also, in a case that the UE 102 perform the UL transmission on the first UL resources in a subframe 'n' (and/or in a slot 'm', and/or in a mini-slot T, and/or in a OS 's'), the UE 102 may perform the UL transmission on the second UL resources in a subframe 'n' (and/or in a slot 'm', and/or in a mini-slot 't', and/or in a OS 's') if the DCI (i.e., the DCI indicating the transmission of the same TB) scheduling the second UL resources is received in a subframe 'N' (and/or in a slot 'M', and/or in a mini-slot 'T', and/or in a OS 'S'). Here, a timing (i.e., the subframe 'n', in a slot 'm', in a mini-slot 't', and/or in a OS 's') may be correspond to a timing in which the DCI is detected (i.e., the subframe 'M', in a slot 'M', in a mini-slot 'T', and/or in a OS 'S'). Here, for example, the correspondence between the timing (i.e., the subframe 'n', in a slot 'm', in a mini-slot 't', and/or in a OS 's') and the timing (i.e., the subframe 'M', in a slot 'M', in a mini-slot 'T', and/or in a OS 'S') may be defined in advance by the specification. Also, for example, the correspondence between the timing (i.e., the subframe 'n', in a slot 'm', in a mini-slot 't', and/or in a OS 's') and the timing (i.e., the subframe 'M', in a slot 'M', in a mini-slot 'T', and/or in a OS 'S') may be configured/indicated by using the RRC signal and/or the DCI (from the gNB 160 to the UE 102).

Also, in a case that the UE 102 perform the UL transmission on the first UL resources in a subframe 'n' (and/or in a slot 'm', and/or in a mini-slot 't', and/or in a OS 's'), the UE 102 may perform the UL transmission on the second UL resources in a subframe 'a' (and/or in a slot 'b', and/or in a mini-slot 'c', and/or in a OS 'd') if the DCI (i.e., the DCI indicating the transmission of the same TB) scheduling the second UL resources is received in a subframe 'A' (and/or in a slot 'B', and/or in a mini-slot 'C', and/or in a OS 'D'). Here, the timing (i.e., the subframe 'n', in a slot 'm', in a mini-slot 't', and/or in a OS 's') may not be correspond to the timing in which the DCI is detected (i.e., the subframe 'A', in a slot 'B', in a mini-slot 'C', and/or in a OS 'D'). And, the timing (i.e., the subframe 'a', in a slot 'b', in a mini-slot 'c', and/or in a OS 'd') may be correspond to the timing in which the DCI is detected (i.e., the subframe 'A', in a slot 'B', in a mini-slot 'C', and/or in a OS 'D'). Here, for example, the correspondence between the timing (i.e., the subframe 'a', in a slot 'b', in a mini-slot 'c', and/or in a OS 'd') and the timing (i.e., the subframe 'A', in a slot 'B', in a mini-slot 'C', and/or in a OS 'D') may be defined in advance by the specification. Also, the correspondence between the timing (i.e., the subframe 'a', in a slot 'b', in a mini-slot 'c', and/or in a OS 'd') and the timing (i.e., the subframe 'A', in a slot 'B', in a mini-slot 'C', and/or in a OS 'D') may be configured/indicated by using the RRC signal and/or the DCI (from the gNB 160 to the UE 102). Namely, the UE 102 may perform the UL transmission in the timing (i.e., the subframe 'a', in a slot 'b', in a mini-slot 'c', and/or in a OS 'd') which correspond to the timing in which the DCI is detected (i.e., the subframe 'A', in a slot 'B', in a mini-slot 'C', and/or in a OS 'D').

Also, in a case that the UE 102 perform the UL transmission on the first UL resources in a subframe 'n' (and/or in a slot 'm', and/or in a mini-slot 't', and/or in a OS 's'), the UE 102 may perform the UL transmission on the second UL resources in a subframe 'n' (and/or in a slot 'm', and/or in a mini-slot 't', and/or in a OS 's') if the DCI (i.e., the DCI indicating the transmission of the same TB) scheduling the second UL resources is received in a subframe 'A' (and/or in a slot 'B', and/or in a mini-slot 'C', and/or in a OS 'D'). Here, the timing (i.e., the subframe 'n', in a slot 'm', in a mini-slot 't', and/or in a OS 's') may not be correspond to the timing in which the DCI is detected (i.e., the subframe 'A', in a slot 'B', in a mini-slot 'C', and/or in a OS 'D'). Here, for example, the correspondence between the timing (i.e., the subframe 'n', in a slot 'm', in a mini-slot T, and/or in a OS 's') and the timing (i.e., the subframe 'A', in a slot 'B', in a mini-slot 'C', and/or in a OS 'D') may be defined in advance by the specification. Also, for example, the correspondence between the timing (i.e., the subframe 'n', in a slot 'm', in a mini-slot T, and/or in a OS 's') and the timing (i.e., the subframe 'A', in a slot 'B', in a mini-slot 'C', and/or in a OS 'D') may be configured/indicated by using the RRC signal and/or the DCI (from the gNB 160 to the UE 102). Namely, in this case, the UE 102 may perform the UL transmission in the timing (i.e., the subframe 'n', in a slot 'm', in a mini-slot 't', and/or in a OS 's') which is configured and/or indicated (by using the RRC signal and/or the DCI as above mentioned). Namely, in this case, the UE 102 may keep the timing of the UL transmission, and may change the UL resources (e.g., from the first UL resources to the second UL resources) for the UL transmission. Namely, in this case, the UE 102 may determine the timing of the UL transmission based on the configuration and/or the indication by the RRC signal and/or the DCI (i.e., follow the RRC configuration and/or the DCI indication as described above). Also, in this case, the UE 102 may determine the UL resources (i.e., the second UL resource) based on the indication by the DCI (i.e., follow the DCI indication (the grant-based transmission/retransmission) as described above).

Also, in a case that the UE 102 perform the UL transmission on the first UL resources in a subframe 'n' (and/or in a slot 'm', and/or in a mini-slot 't', and/or in a OS 's'), the UE 102 is not expect to receive the DCI (i.e., the DCI indicating the transmission of the same TB, the DCI scheduling the second UL resources) in a subframe 'A' (and/or in a slot 'B', and/or in a mini-slot 'C', and/or in a OS 'D'). Here, as described above, the timing (i.e., the subframe 'n', in a slot 'm', in a mini-slot 't', and/or in a OS 's') may not be correspond to the timing in which the DCI is detected (i.e., the subframe 'A', in a slot B', in a mini-slot 'C', and/or in a OS 'D'). Namely, in this case, the UE 102 is expected to receive the DCI (i.e., the DCI indicating the transmission of the same TB, the DCI scheduling the second UL resources) only in a subframe 'N' (and/or in a slot 'M', and/or in a mini-slot 'T', and/or in a OS 'S'). For example, in this case, the UE 102 may monitor the DCI (i.e., the DCI indicating the transmission of the same TB, the DCI scheduling the second UL resources) only in a subframe 'N' (and/or in a slot 'M', and/or in a mini-slot 'T', and/or in a OS 'S'). Here, the correspondence between the timing (i.e., the subframe 'n', in a slot 'm', in a mini-slot T, and/or in a OS 's') and the timing (i.e., the subframe 'N', in a slot 'M', in a mini-slot 'T', and/or in a OS 'S') may be defined in advance by the specification. Also, for example, the correspondence between the timing (i.e., the subframe 'n', in a slot 'm', in a mini-slot 't', and/or in a OS 's') and the timing (i.e., the subframe 'N', in a slot 'M', in a mini-slot 'T', and/or in a OS 'S') may be configured/indicated by using the RRC signal and/or the DCI (from the gNB 160 to the UE 102). Namely, in this case, the UE 102 may receive the DCI only in the timing (i.e., the subframe 'N', in a slot 'M', in a mini-slot 'T', and/or in a OS 'S') which is correspond to the timing configured and/or indicated (by using the RRC signal and/or the DCI as above mentioned). Namely, in this case, the gNB 160 may transmit the DCI (i.e., the DCI indicating the transmission of the same TB, the DCI scheduling the second UL resources) only in the timing (i.e., the subframe 'N', in a slot 'M', in a mini-slot 'T', and/or in a OS 'S') which is correspond to the timing configured and/or indicated (by using the RRC signal and/or the DCI as above mentioned).

Also, the UL grant may indicate a different resource compared to the configured resource for repetitions. The UE 102 may start a granted-based transmission/retransmission without stopping the current repetitions.

Figure 2:
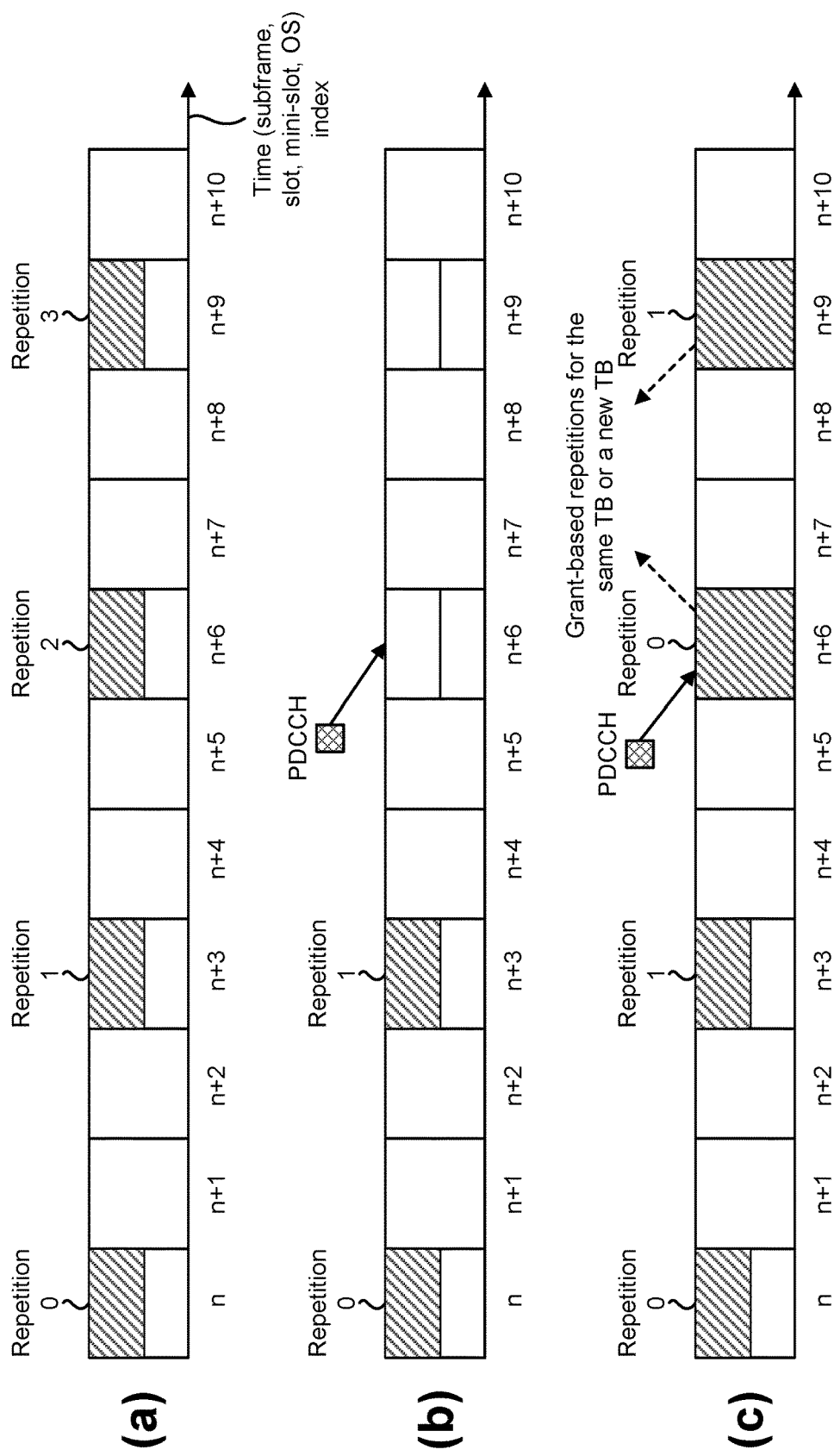
FIG. 2 is an example illustrating timing between a physical downlink control channel (PDCCH) and corresponding repetitions for an uplink (UL) ultra-reliable and low-latency communications (URLLC) transmission.

As described above, the timing between the PDCCH (e.g., the timing in which the DCI is detected) and the corresponding action (e.g., the UL transmission) may be fixed by specification or semi-statically configured by higher layer. Here, the corresponding action may be starting a corresponding grant-based transmission/retransmission and/or stopping current configured repetitions. The grant-based transmission/retransmission and the configured repetitions may use the same time granularity (e.g., subframe, slot, mini-slot, OS). A UE 102 configured with K repetitions for URLLC UL transmission may monitor the PDCCH at the same time granularity. The PDCCH at timing (subframe, slot, mini-slot, OS) index n may terminate current repetition(s) at timing (subframe, slot, mini-slot, OS) index n+k. The PDCCH at timing (subframe, slot, mini-slot, OS) index n may trigger grant-based UL transmission/retransmission at timing (subframe, slot, mini-slot, OS) index n+k. In other words, to stop the configured repetition(s) from timing index n or to trigger grant-based UL transmission/retransmission at timing index n, the UE 102 is not expected to receive the PDCCH at the timing other than timing index n–k. The value of k may be fixed by specification or configured by using the RRC signal. FIG. 2 illustrates an example with k=1.

In an implementation, the timing between the PDCCH (e.g., the timing in which the DCI is detected) and the corresponding action (e.g., the UL transmission) may be indicated by a field in the DCI from a set of values and the set of values is configured by higher layer. In another implementation, the timing can be any value dynamically indicated by the DCI.

Also, the PDCCH may be based on a different time granularity comparing to the configured repetitions. UE may monitor the PDCCH at a different time granularity comparing to the configured repetitions. The corresponding action may align with the timing of the PDCCH. FIGS. 3A-3D illustrate an example.

In a case that multiple granularities (e.g., subframe-based, slot-based, mini-slot-based or OS-based) may be supported for the grant-based transmission(s)/retransmission(s), a flag may be included in the DCI carried by the PDCCH to differentiate the formats.

To enhance the reliability of the PDCCH, R repetitions including the first transmission (R>=1) for the same downlink control information are supported for PDCCH transmission. The gNB 160 may transmit multiple repetition numbers (i.e., multiple values of R) by using the RRC signal and indicate one value of repetition number R by using the DCI format. Also, the gNB 160 may transmit a fixed repetition number by using the RRC signal or may dynamically indicate the repetition number by using the DCI format.

To enhance the reliability of the PDCCH, transmitter diversity (e.g., multi-antenna) and/or a low coding rate (e.g., higher aggregation level) may be supported for the PDCCH transmission. This may be configured by higher layer signaling or specified in the specification.

The PDCCH used for activation/deactivation of SPS-like URLLC UL transmission/repetition(s) and the PDCCH used for granted-based transmission(s)/retransmission(s) may use the same DCI format. To activate or deactivate the SPS-like URLLC UL transmission/repetition(s), some fields in the DCI may be set to default value(s), which may be determined by the specification. To determine whether the grant is for the same TB or a new TB, additional bit(s) (e.g., a new data indicator) may be used, or some fields in the DCI may be set to default value(s), which may be determined by the specification. To differentiate the granularity (e.g., subframe-based, slot-based, mini-slot-based or OS-based) of the granted transmission(s)/retransmission(s), a flag may be added to the DCI. In case that asynchronous HARQ is supported for UL URLLC, HARQ process number is indicated by using the DCI.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB URLLC module 194. The gNB URLLC module 194 may perform URLLC operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 is an example illustrating timing between a PDCCH and corresponding repetitions for an UL URLLC transmission. In FIG. 2(a), the UE 102 may be configured with four repetitions for UL URLLC. The UE 102 may transmit a TB starting from timing index n, which may be repeated in timing index n+3, timing index n+6 and timing index n+9.

A UE 102 configured with K repetitions for URLLC UL transmission may monitor the PDCCH at the same time granularity. The PDCCH at timing (subframe, slot, mini-slot, OS) index n may trigger grant-based UL transmission/retransmission at timing (subframe, slot, mini-slot, OS) index n+k. In other words, to stop the configured repetition(s) from timing index n or to trigger grant-based UL transmission/retransmission at timing index n, the UE 102 is not expected to receive the PDCCH at the timing other than timing index n−k. The value of k may be fixed by specification or configured by using the RRC signal. In FIG. 2, k=1. In FIG. 2(b), the UE 102 receives a PDCCH at timing index n+5. The UE 102 then stops the configured repetitions from timing index n+6.

In FIG. 2(c), the UE 102 receives a PDCCH at timing index n+5 and starts grant-based transmission(s)/retransmission(s) at timing index n+6. The grant-based transmission(s)/retransmission(s) may override the configured repetition 3 and repetition 4.

Figure 3A:
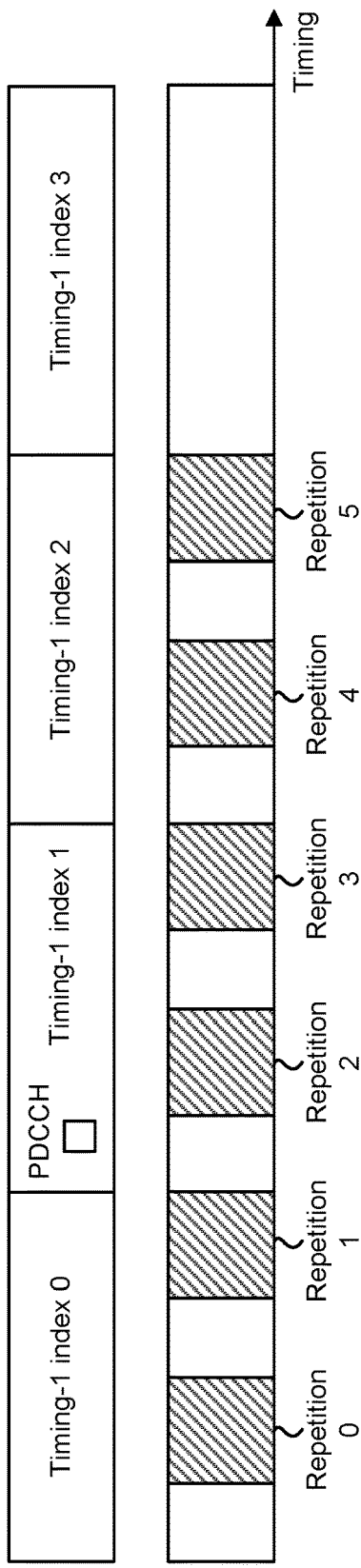
FIGS. 3A-3D illustrate examples of a PDCCH that is based on a different time granularity compared to configured UL URLLC repetitions.

FIGS. 3A-3D illustrate examples of a PDCCH that is based on a different time granularity compared to configured UL URLLC repetitions. In FIG. 3A, the UE 102 is configured with six repetitions for UL URLLC at a fine timing granularity (Timing-2). The UE 102 monitors the PDCCH at a coarse timing granularity (Timing-1). In an example, Timing-1 may be slot based while Timing-2 is mini-slot based.

Figure 3B:
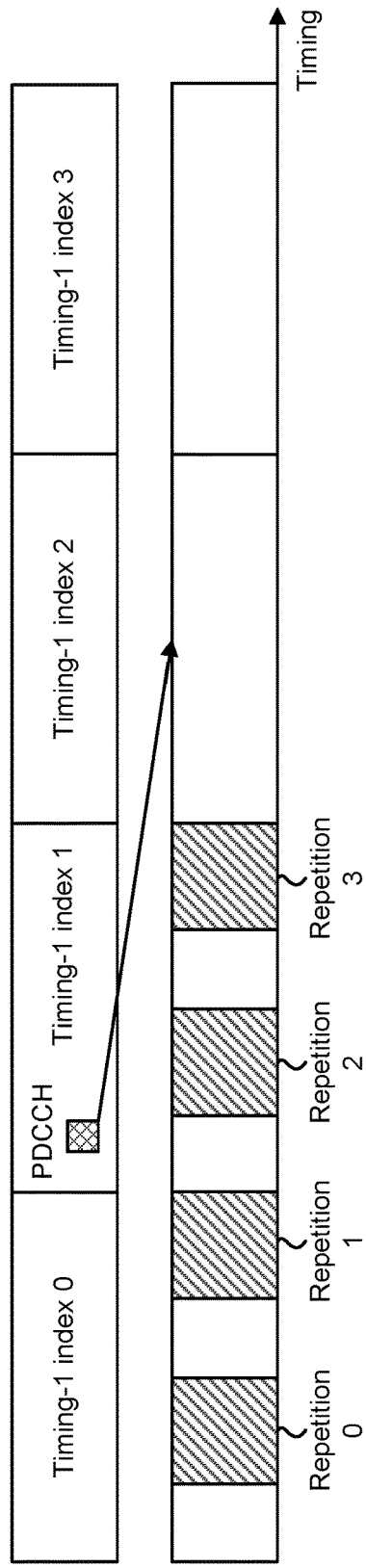

In FIG. 3B, the UE 102 receives PDCCH at Timing-1 index 1. The UE 102 stops the configured repetitions at Timing-1 index 2.

Figure 3C:
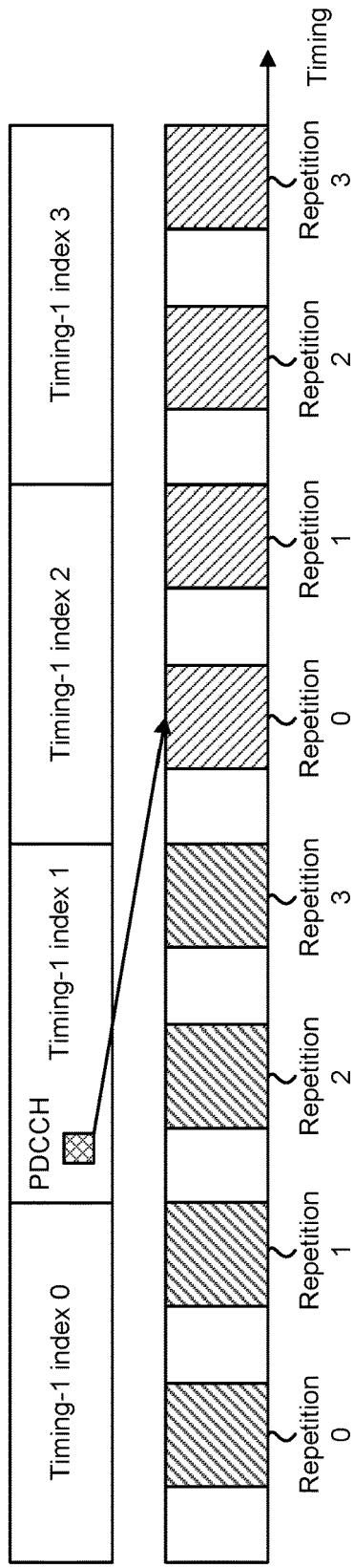

In FIG. 3C, the UE 102 receives PDCCH at Timing-1 index 1 and starts grant-based repetitions for the same TB or a new TB at Timing-1 index 2. The grant-based transmission(s)/retransmission(s) can override the configured repetitions. The bitmap or offset/index of the granted resource may be different compared to the configured repetitions.

Figure 3D:
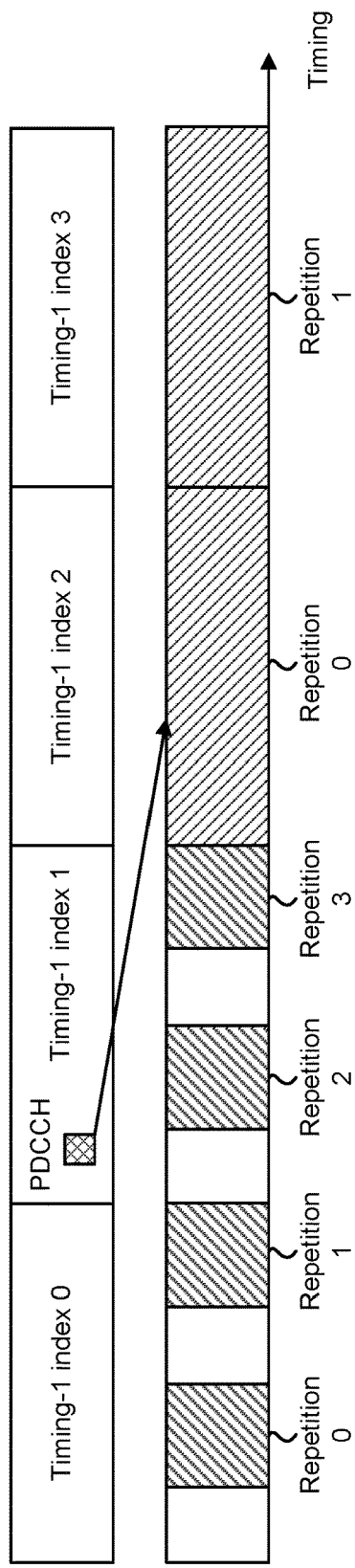

In FIG. 3D, the UE 102 receives PDCCH at Timing-1 index 1 and starts grant-based repetitions for the same TB or a new TB at Timing-1 index 2. The granularity of the granted resource may be different compared to the configured repetitions.

In the above-mentioned implementations the repetition may be performed via semi-statically configured uplink resources, at least for an initial transport block. However, it is also possible that the other resource configuration schemes apply. For example, for any transport block, the repetition may be performed via the uplink resources which are assigned by dynamic signaling (e.g., dynamic UL grant). For another example, the uplink resources may be configured semi-persistently.

At least in a case that the uplink resources which are assigned by dynamic signaling, the UE 102 may have to keep monitoring PDCCH even when the UE 102 does not have UL data in its UL data buffer. In this instance, whether to perform the repetition may depend on the detected PDCCH. More specifically, for example, the UE 102 may monitor PDCCHs on common search space (CSS) and UE-specific search space (USS) in a given subframe. If the UE 102 configured with PUSCH repetition detects PDCCH with UL grant DCI format on USS, the UE 102 may be allowed to perform the PUSCH repetition using the UL resource which is scheduled by the detected PDCCH. On the other hand, if the UE 102 configured with PUSCH repetition detects PDCCH with UL grant DCI format on CSS, the UE 102 may not be allowed to use the UL resource scheduled by the detected PDCCH for the PUSCH repetition and may perform normal PUSCH transmission (i.e., non-repeated PUSCH transmission, one-time PUSCH transmission).

In another example, the UE 102 may monitor a PDCCH with UL grant DCI format in multiple control resource sets in a given subframe. If the UE 102 configured with PUSCH repetition detects PDCCH with UL grant DCI format in control resource set A (e.g., control resource set configured by a UE-dedicated RRC configuration message), the UE 102 may be allowed to perform the PUSCH repetition using the UL resource which is scheduled by the detected PDCCH. If the UE 102 configured with PUSCH repetition detects PDCCH with UL grant DCI format in control resource set B (e.g. control resource set configured by a common RRC configuration message), the UE 102 may not be allowed to use the UL resource scheduled by the detected PDCCH for the PUSCH repetition and may perform normal PUSCH transmission.

In yet another example, the UE 102 may monitor a PDCCH with UL grant DCI format A and another PDCCH with UL grant DCI format B in a given subframe. If the UE 102 configured with PUSCH repetition detects PDCCH with UL grant DCI format A, the UE 102 may be allowed to perform the PUSCH repetition using the UL resource which is scheduled by the detected PDCCH. If the UE 102 configured with PUSCH repetition detects PDCCH with UL grant DCI format B, the UE 102 may not be allowed to use the UL resource scheduled by the detected PDCCH for the PUSCH repetition and may perform normal PUSCH transmission.

In yet another example, the UE 102 may monitor a PDCCH with UL grant DCI format with CRC scrambled with RNTI A and another PDCCH with UL grant DCI format with CRC scrambled with RNTI B in a given subframe. If the UE 102 configured with PUSCH repetition detects PDCCH with UL grant DCI format with CRC scrambled with RNTI A, the UE 102 may be allowed to perform the PUSCH repetition using the UL resource which is scheduled by the detected PDCCH. If the UE 102 configured with PUSCH repetition detects PDCCH with UL grant DCI format with CRC scrambled with RNTI B, the UE 102 may not be allowed to use the UL resource scheduled by the detected PDCCH for the PUSCH repetition and may perform normal PUSCH transmission.

In yet another example, the UE 102 may monitor a PDCCH with UL grant DCI format in a given subframe. If the UE 102 configured with PUSCH repetition detects PDCCH with UL grant DCI format of which a certain field(s) are set to a certain value(s), the UE 102 may be allowed to perform the PUSCH repetition using the UL resource which is scheduled by the detected PDCCH. Otherwise, the UE 102 may not be allowed to use the UL resource scheduled by the detected PDCCH for the PUSCH repetition and may perform normal PUSCH.

In yet another example, the UE 102 may monitor a PDCCH with UL grant DCI format scheduling slot-based PUSCH and a PDCCH with UL grant DCI format scheduling sub-slot-based PUSCH in a given subframe. If the UE 102 configured with PUSCH repetition detects PDCCH with UL grant DCI format scheduling slot-based PUSCH, the UE 102 may be allowed to perform the PUSCH repetition using the UL resource which is scheduled by the detected PDCCH. If the UE 102 configured with PUSCH repetition detects PDCCH with UL grant DCI format scheduling sub-slot-based PUSCH, the UE 102 may not be allowed to use the UL resource scheduled by the detected PDCCH for the PUSCH repetition and may perform normal PUSCH transmission.

In yet another example, the UE 102 may monitor a PDCCH with UL grant DCI format scheduling numerology_A-based PUSCH (e.g. PUSCH based on the numerology which is configured by a UE-dedicated RRC configuration message) and a PDCCH with UL grant DCI format scheduling numerology_B-based PUSCH (e.g. PUSCH based on a default numerology or the numerology which is configured by a common RRC configuration message) in a given subframe. If the UE 102 configured with PUSCH repetition detects PDCCH with UL grant DCI format scheduling numerology_A-based PUSCH, the UE 102 may be allowed to perform the PUSCH repetition using the UL resource which is scheduled by the detected PDCCH. If the UE 102 configured with PUSCH repetition detects PDCCH with UL grant DCI format scheduling numerology_B-based PUSCH, the UE 102 may not be allowed to use the UL resource scheduled by the detected PDCCH for the PUSCH repetition and may perform normal PUSCH transmission.

Figure 4:
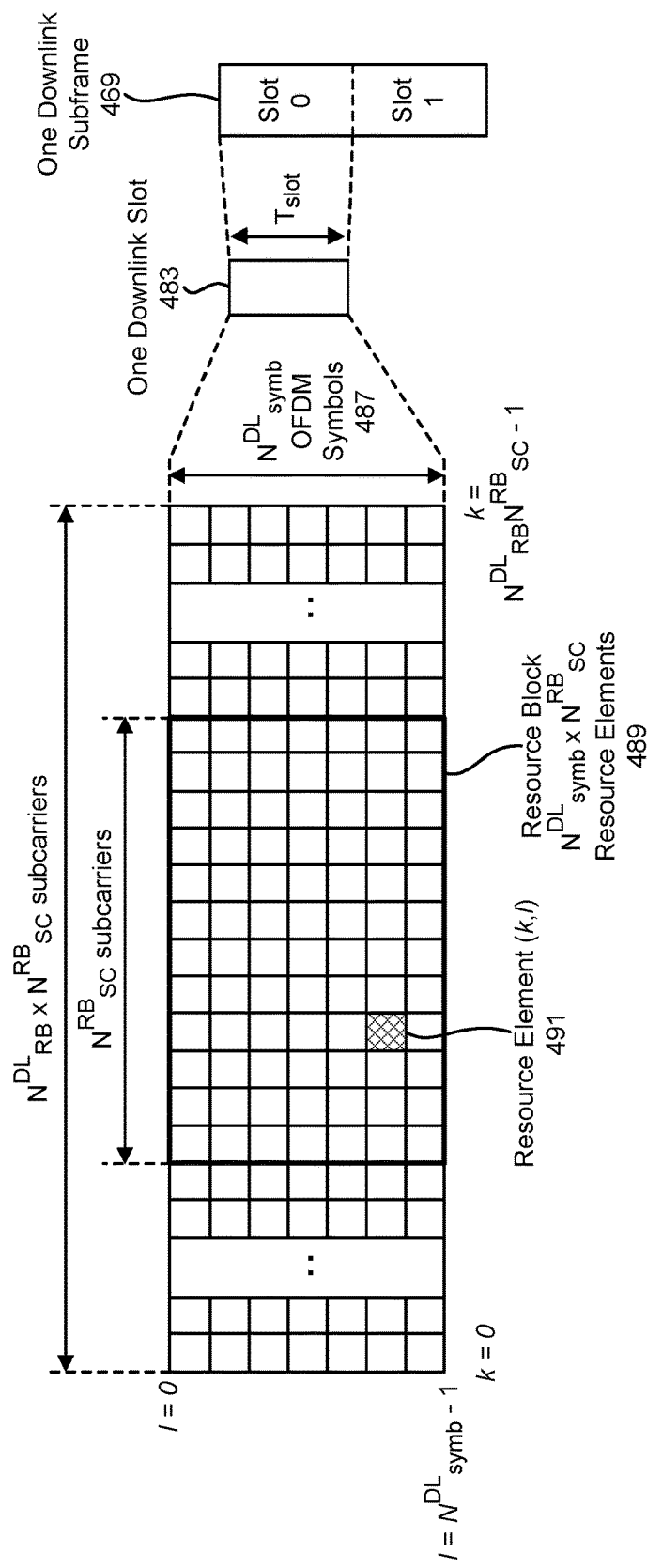
FIG. 4 is a diagram illustrating one example of a resource grid for the downlink.

FIG. 4 is a diagram illustrating one example of a resource grid for the downlink. The resource grid illustrated in FIG. 4 may be utilized in some implementations of the systems and methods disclosed herein. More detail regarding the resource grid is given in connection with FIG. 1.

In FIG. 4, one downlink subframe 469 may include two downlink slots 483. $N^{DL}_{RB}$ is downlink bandwidth configuration of the serving cell, expressed in multiples of $N^{RB}_{sc}$, where $N^{RB}_{sc}$ is a resource block 489 size in the frequency domain expressed as a number of subcarriers, and $N^{DL}_{symb}$ is the number of OFDM symbols 487 in a downlink slot 483. A resource block 489 may include a number of resource elements (RE) 491.

For a PCell, $N^{DL}_{RB}$ is broadcast as a part of system information. For an SCell (including an LAA SCell), $N^{DL}_{RB}$ is configured by a RRC message dedicated to a UE 102. For PDSCH mapping, the available RE 491 may be the RE 491 whose index 1 fulfils $1 \ge 1_{data,start}$ and/or $1_{data,end} \ge 1$ in a subframe.

In the downlink, the OFDM access scheme with cyclic prefix (CP) may be employed, which may be also referred to as CP-OFDM. In the downlink, PDCCH, EPDCCH, PDSCH and the like may be transmitted. A downlink radio frame may include multiple pairs of downlink resource blocks (RBs) which is also referred to as physical resource blocks (PRBs). The downlink resource block (RB) pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 5:
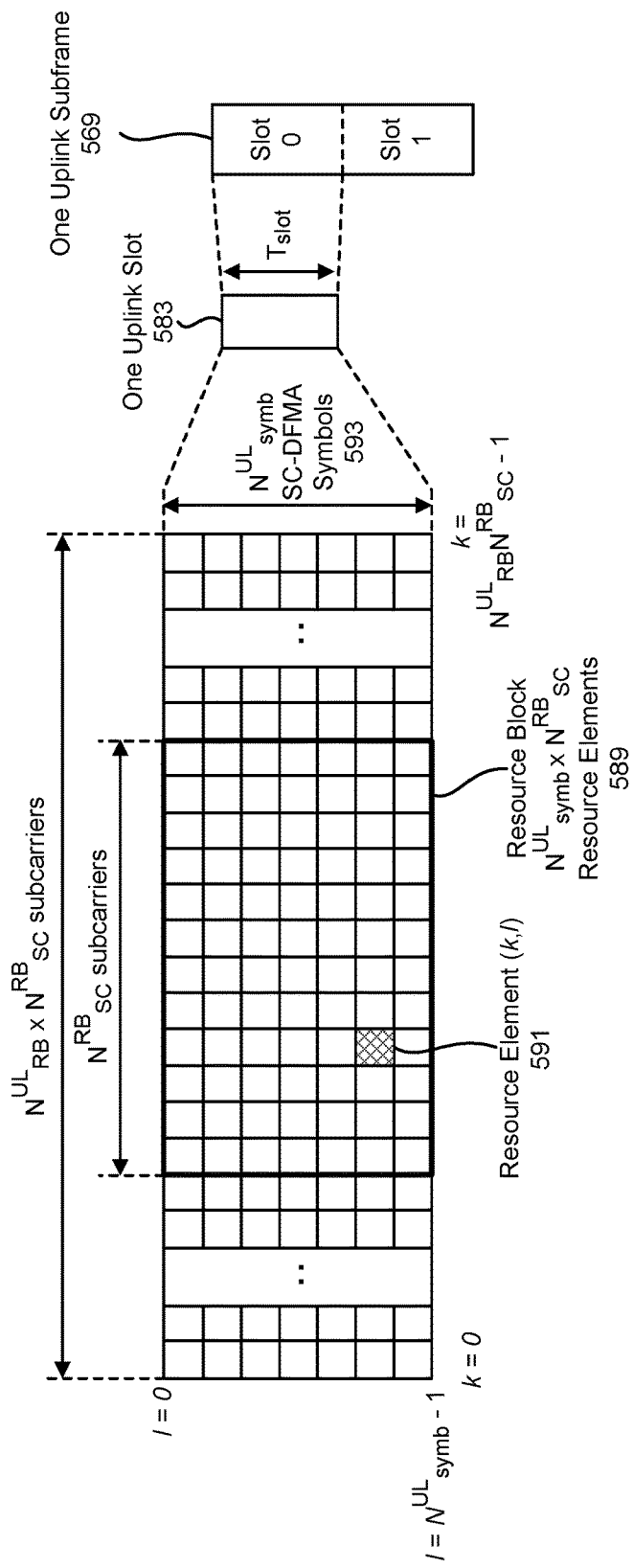
FIG. 5 is a diagram illustrating one example of a resource grid for the uplink.

FIG. 5 is a diagram illustrating one example of a resource grid for the uplink. The resource grid illustrated in FIG. 5 may be utilized in some implementations of the systems and methods disclosed herein. More detail regarding the resource grid is given in connection with FIG. 1.

In FIG. 5, one uplink subframe 569 may include two uplink slots 583. $N^{UL}_{RB}$ is uplink bandwidth configuration of the serving cell, expressed in multiples of $N^{RB}_{sc}$, where $N^{RB}_{sc}$ is a resource block 589 size in the frequency domain expressed as a number of subcarriers, and $N^{UL}_{symb}$ is the number of SC-FDMA symbols 593 in an uplink slot 583. A resource block 589 may include a number of resource elements (RE) 591.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot.

The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 6:
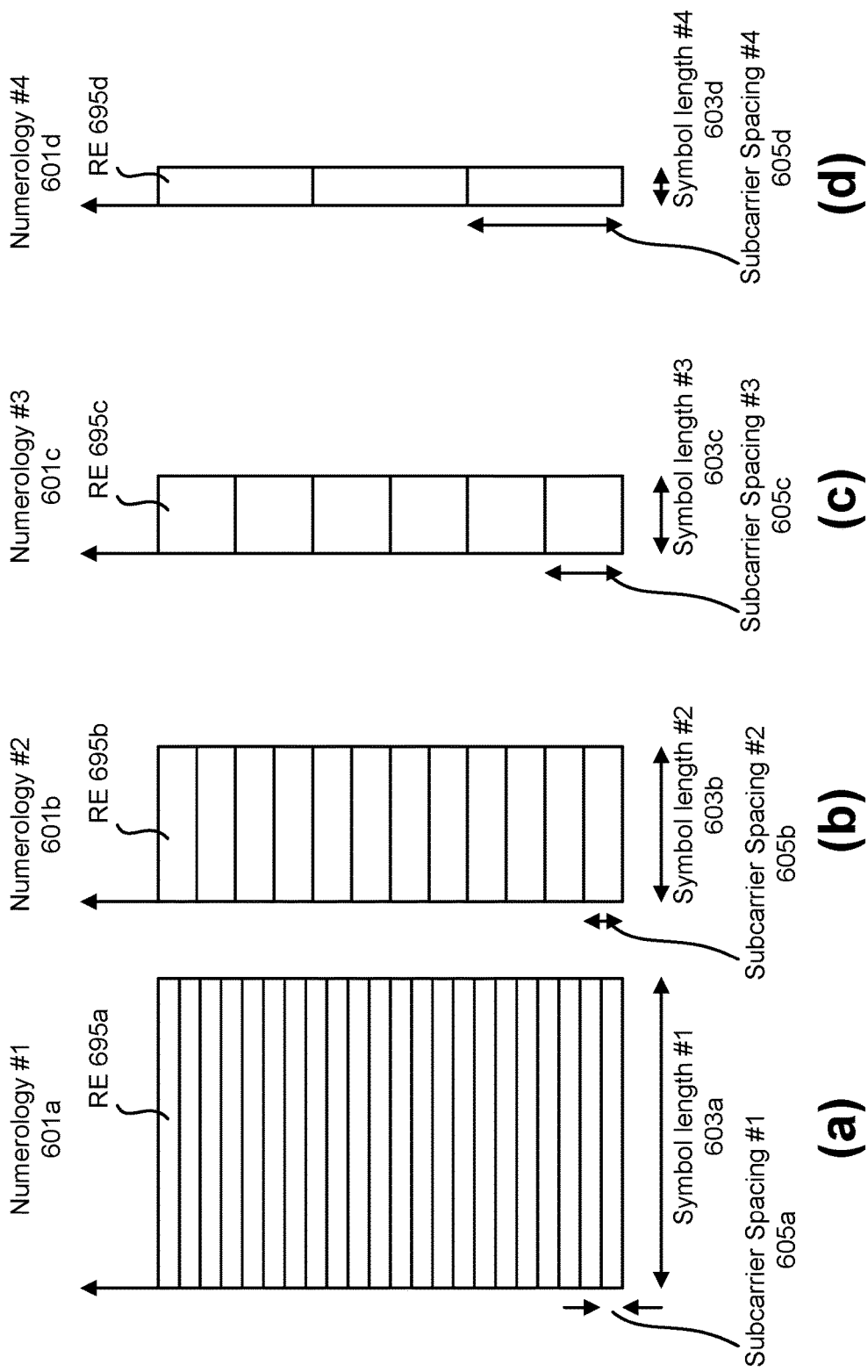
FIG. 6 shows examples of several numerologies.

FIG. 6 shows examples of several numerologies 601. The numerology #1 601a may be a basic numerology (e.g., a reference numerology). For example, a RE 695a of the basic numerology 601a may be defined with subcarrier spacing 605a of 15 kHz in frequency domain and 2048 Ts+CP length (e.g., 160 Ts or 144 Ts) in time domain (i.e., symbol length #1 603a), where Ts denotes a baseband sampling time unit defined as 1/(15000*2048) seconds. For the i-th numerology, the subcarrier spacing 605 may be equal to $15*2^i$ and the effective OFDM symbol length $2048*2^{-i}$*Ts. It may cause the symbol length is $2048*2^{-i}$*Ts+CP length (e.g., $160*2^{-i}$*Ts or $144*2^{-i}$*Ts). In other words, the subcarrier spacing of the i+1-th numerology is a double of the one for the i-th numerology, and the symbol length of the i+1-th numerology is a half of the one for the i-th numerology. FIG. 6 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 7:
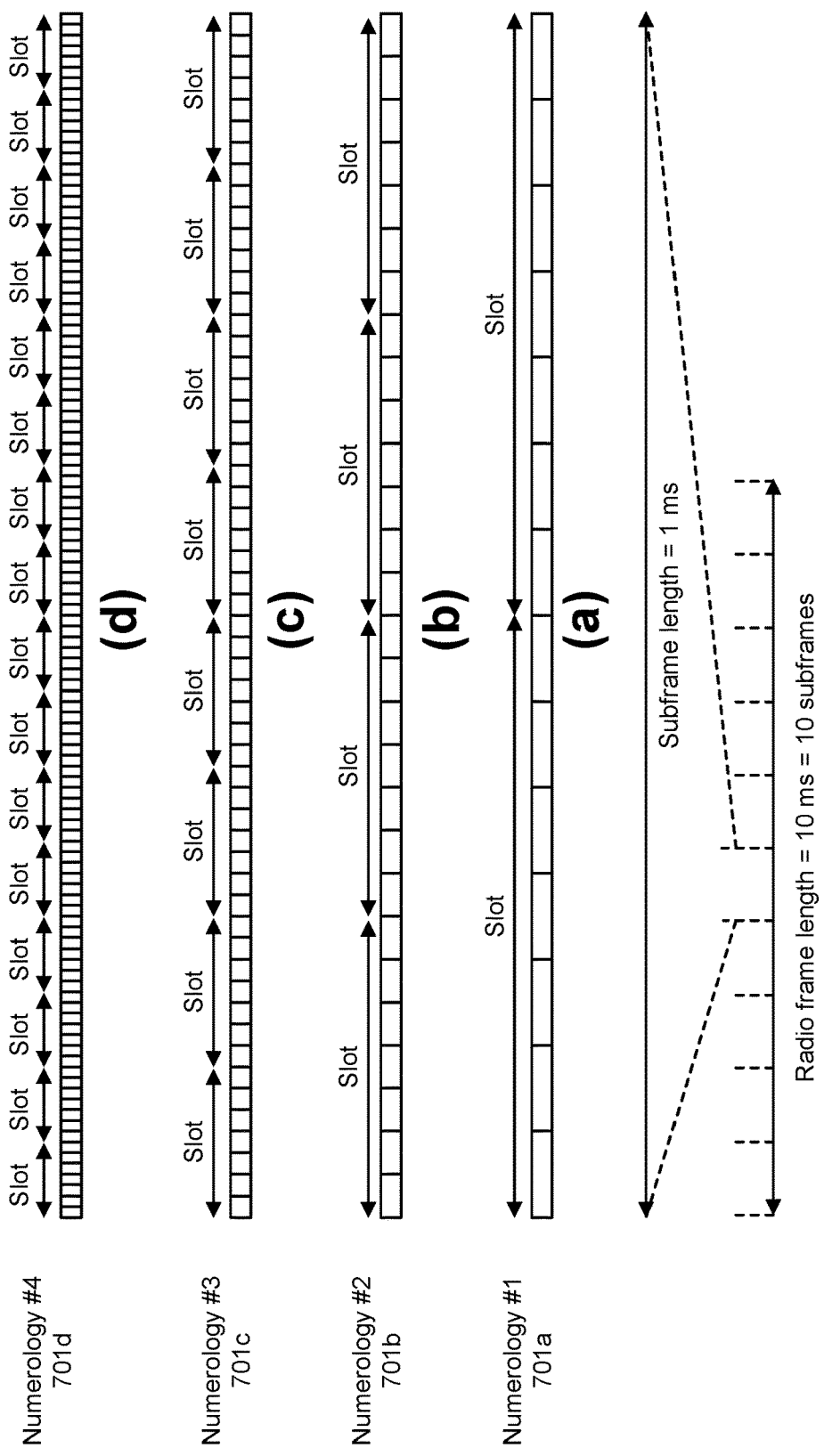
FIG. 7 shows examples of subframe structures for the numerologies that are shown in FIG. 6.

FIG. 7 shows examples of subframe structures for the numerologies 701 that are shown in FIG. 6. Given that a slot includes $N^{DL}_{symb}$ (or $N^{UL}_{symb}$)=7 symbols, the slot length of the i+1-th numerology 701 is a half of the one for the i-th numerology 701, and eventually the number of slots in a subframe (i.e., 1 ms) becomes double. It may be noted that a radio frame may include 10 subframes, and the radio frame length may be equal to 10 ms.

Figure 8:
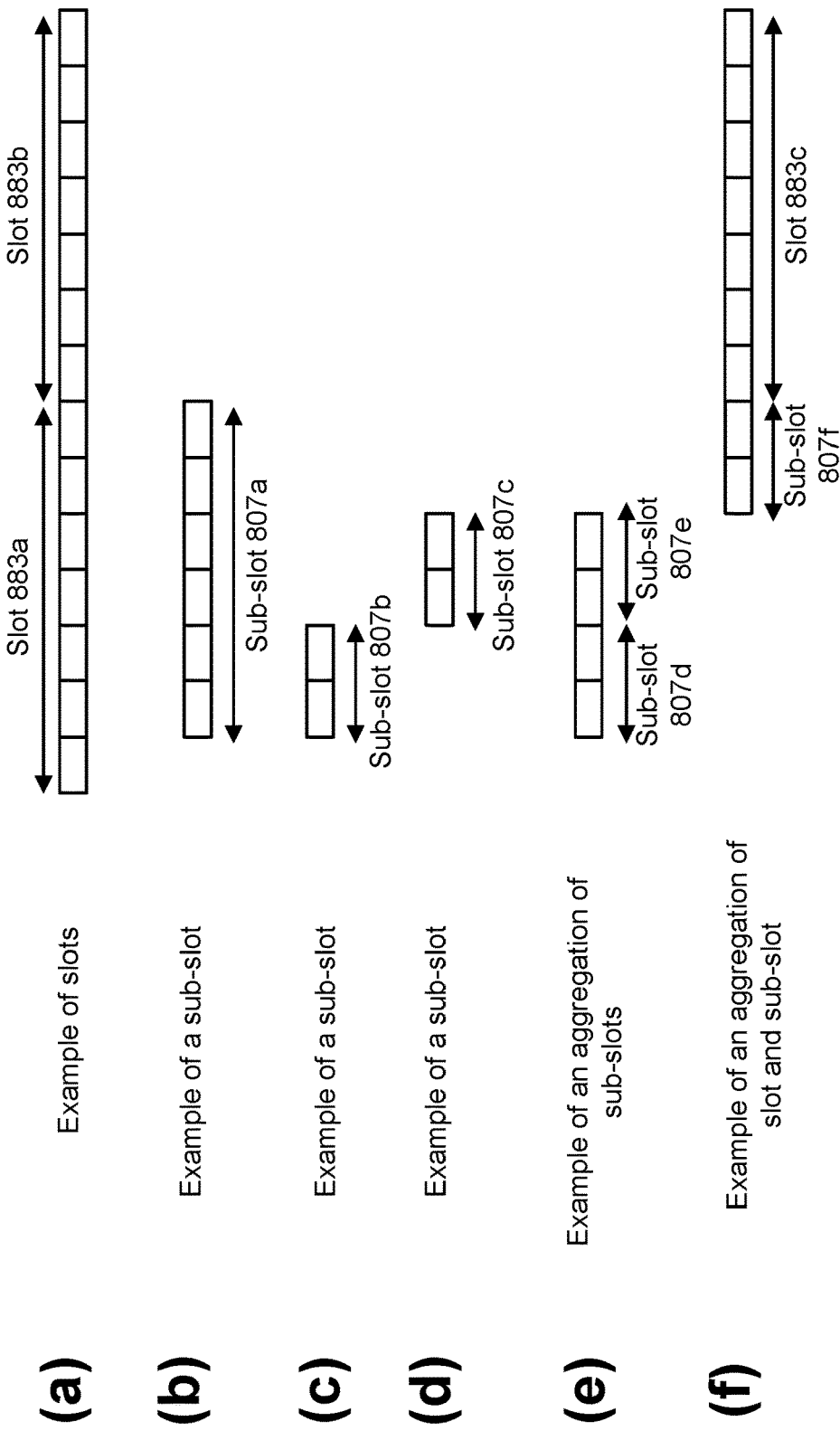
FIG. 8 shows examples of slots and sub-slots.

FIG. 8 shows examples of slots 883 and sub-slots 807. If a sub-slot 807 is not configured by higher layer, the UE 102 and the eNB/gNB 160 may only use a slot 883 as a scheduling unit. More specifically, a given transport block may be allocated to a slot 883. If the sub-slot 807 is configured by higher layer, the UE 102 and the eNB/gNB 160 may use the sub-slot 807 as well as the slot 883. The sub-slot 807 may include one or more OFDM symbols. The maximum number of OFDM symbols that constitute the sub-slot 807 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 807 may start at any symbol within a slot 883 unless it collides with a control channel. There could be restrictions of mini-slot length based on restrictions on starting position. For example, the sub-slot 807 with the length of $N^{DL}_{symb}-1$ (or $N^{UL}_{symb}-1$) may start at the second symbol in a slot 883. The starting position of a sub-slot 807 may be indicated by a physical layer control channel (e.g., by DCI format). Alternatively, the starting position of a sub-slot 807 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 807.

In cases when the sub-slot 807 is configured, a given transport block may be allocated to either a slot 883, a sub-slot 807, aggregated sub-slots 807 or aggregated sub-slot(s) 807 and slot 883. This unit may also be a unit for HARQ-ACK bit generation.

Figure 9:
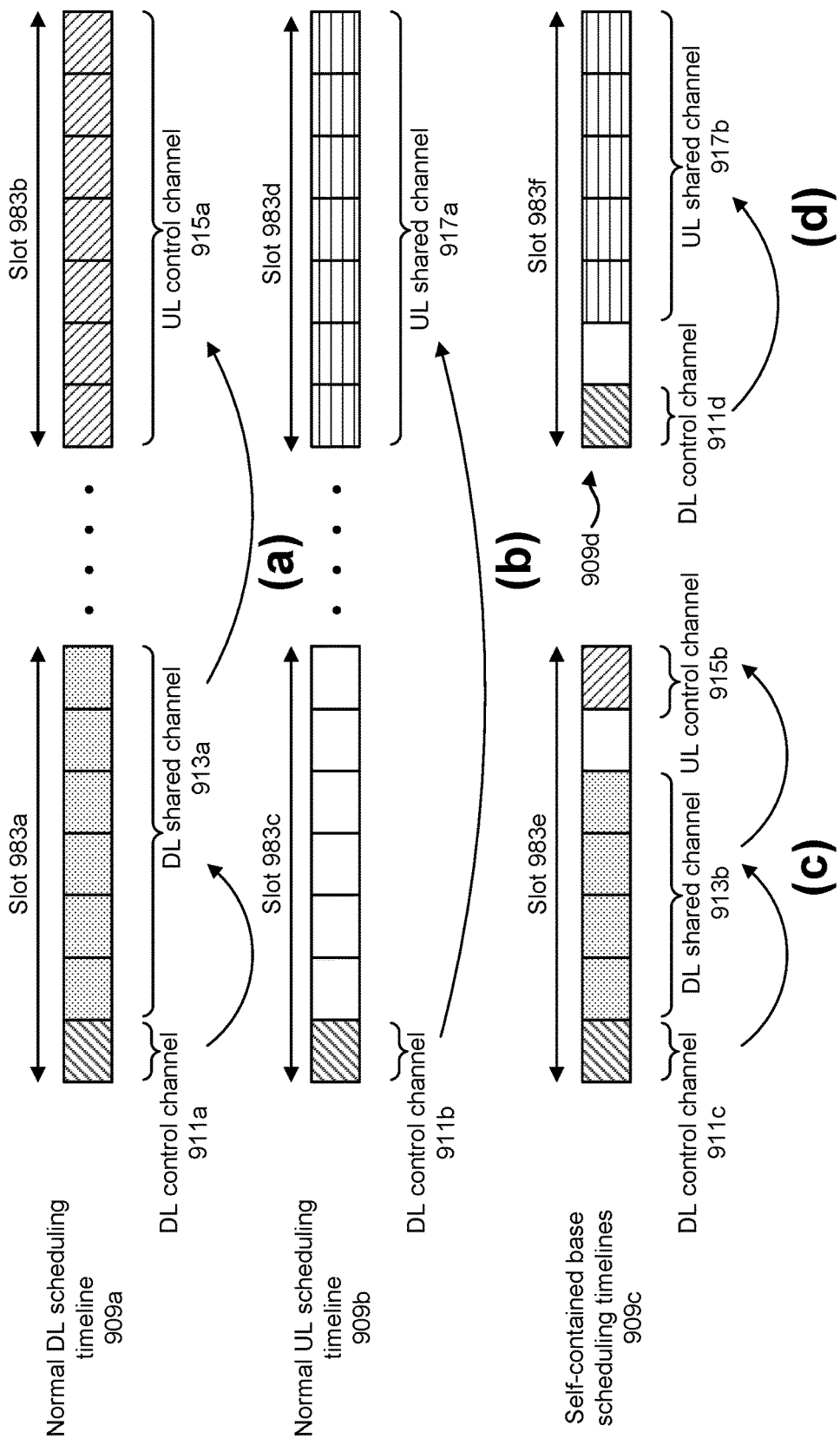
FIG. 9 shows examples of scheduling timelines.

FIG. 9 shows examples of scheduling timelines 909. For a normal DL scheduling timeline 909a, DL control channels are mapped the initial part of a slot 983a. The DL control channels 911 schedule DL shared channels 913a in the same slot 983a. HARQ-ACKs for the DL shared channels 913a (i.e., HARQ-ACKs each of which indicates whether or not transport block in each DL shared channel 913a is detected successfully) are reported via UL control channels 915a in a later slot 983b. In this instance, a given slot 983 may contain either one of DL transmission and UL transmission.

For a normal UL scheduling timeline 909b, DL control channels 911b are mapped the initial part of a slot 983c. The DL control channels 911b schedule UL shared channels 917a in a later slot 983d. For these cases, the association timing (time shift) between the DL slot 983c and the UL slot 983d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 909c, DL control channels 911c are mapped to the initial part of a slot 983e. The DL control channels 911c schedule DL shared channels 913b in the same slot 983e. HARQ-ACKs for the DL shared channels 913*b* are reported in UL control channels 915*b*, which are mapped at the ending part of the slot 983*e*.

For a self-contained base UL scheduling timeline 909*d*, DL control channels 911*d* are mapped to the initial part of a slot 983*f*. The DL control channels 911*d* schedule UL shared channels 917*b* in the same slot 983*f*. For these cases, the slot 983*f* may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 10:
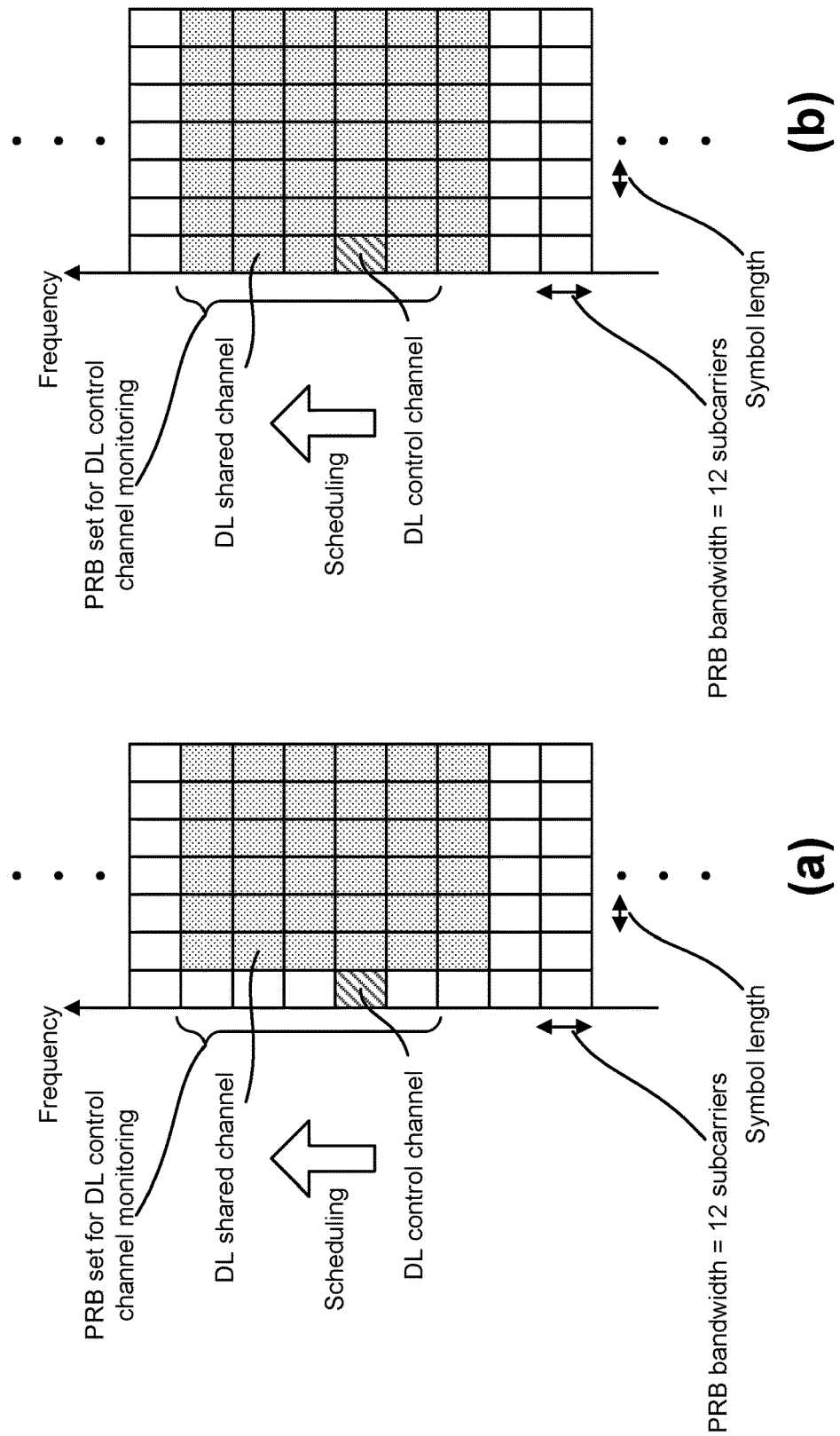
FIG. 10 shows examples of downlink (DL) control channel monitoring regions.

FIG. 10 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 11:
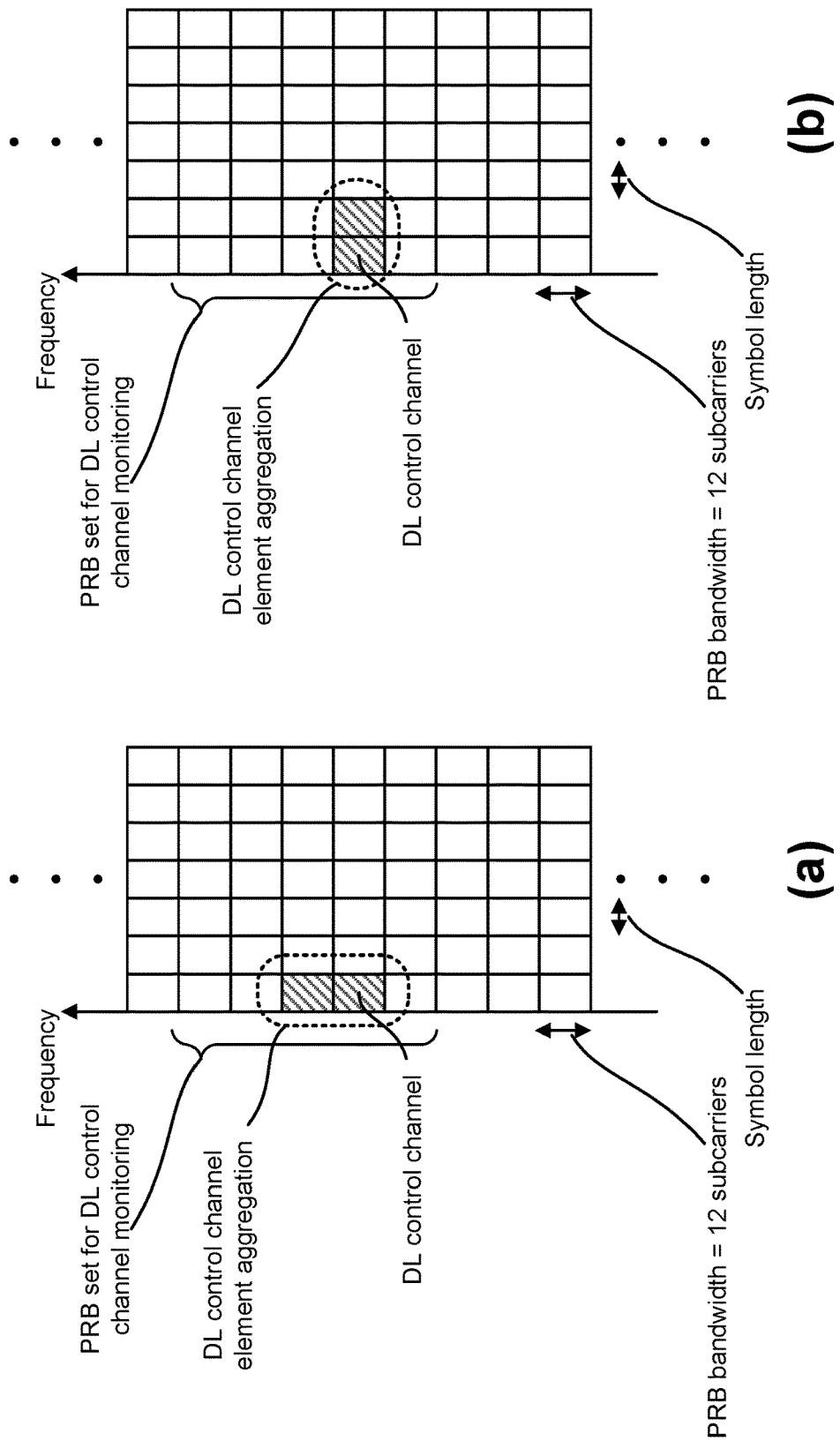
FIG. 11 shows examples of DL control channel which includes more than one control channel elements.

FIG. 11 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 12:
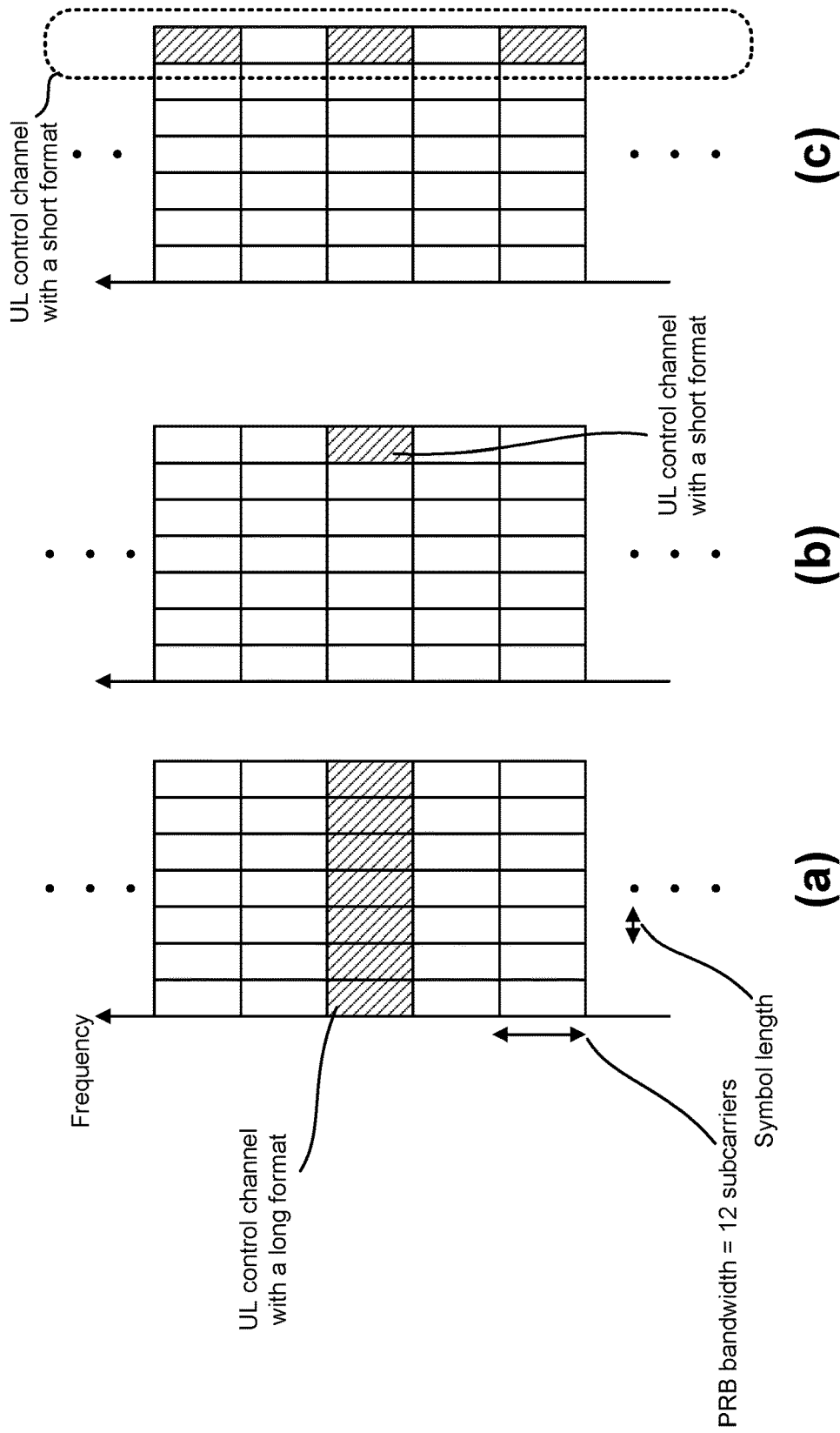
FIG. 12 shows examples of uplink (UL) control channel structures.

FIG. 12 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 13:
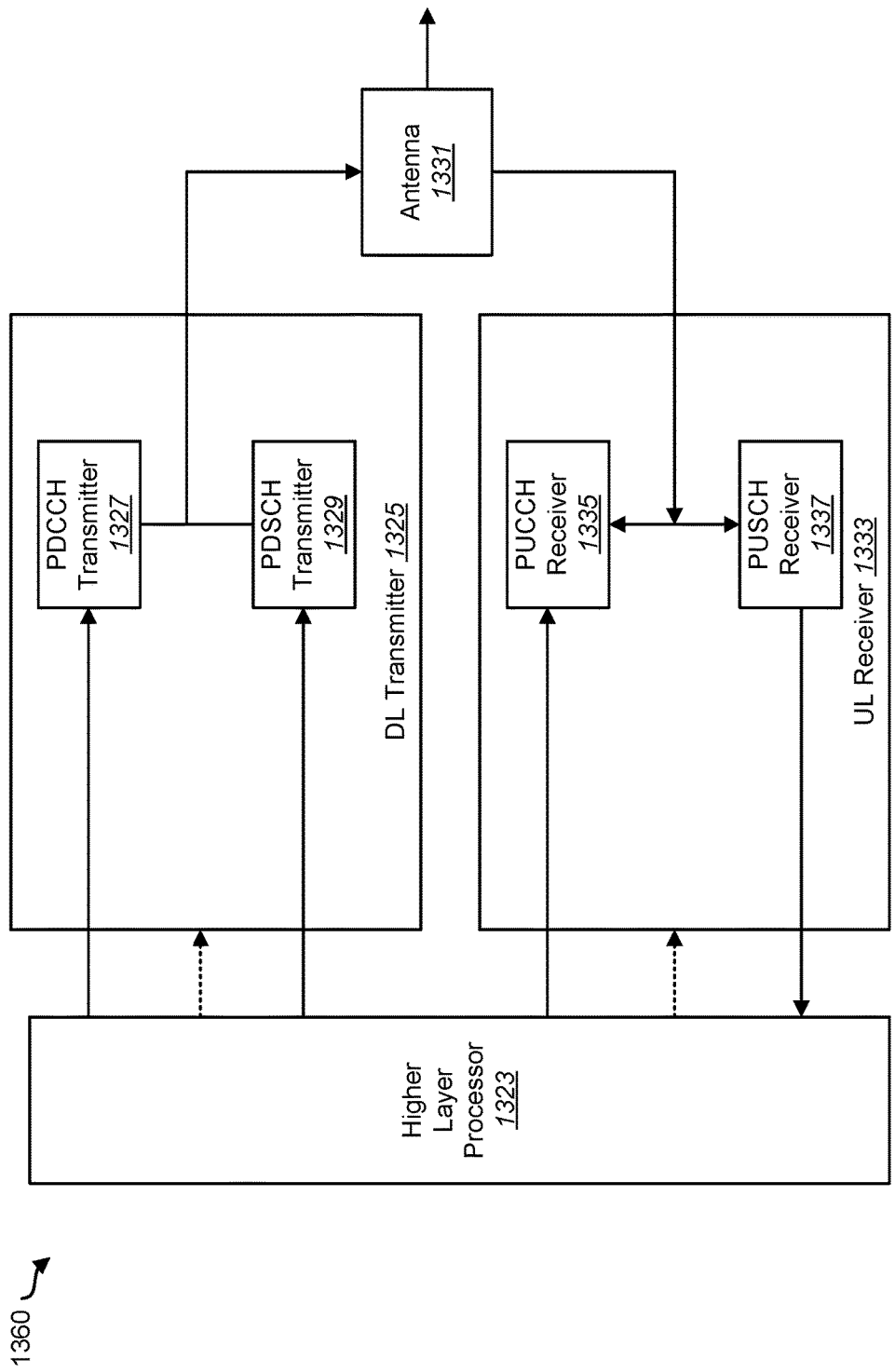
FIG. 13 is a block diagram illustrating one implementation of a gNB.

FIG. 13 is a block diagram illustrating one implementation of a gNB 1360. The gNB 1360 may include a higher layer processor 1323, a DL transmitter 1325, a UL receiver 1333, and one or more antenna 1331. The DL transmitter 1325 may include a PDCCH transmitter 1327 and a PDSCH transmitter 1329. The UL receiver 1333 may include a PUCCH receiver 1335 and a PUSCH receiver 1337.

The higher layer processor 1323 may manage physical layer's behaviors (the DL transmitter's and the UL receiver's behaviors) and provide higher layer parameters to the physical layer. The higher layer processor 1323 may obtain transport blocks from the physical layer. The higher layer processor 1323 may send/acquire higher layer messages such as an RRC message and MAC message to/from a UE's higher layer. The higher layer processor 1323 may provide the PDSCH transmitter transport blocks and provide the PDCCH transmitter transmission parameters related to the transport blocks.

The DL transmitter 1325 may multiplex downlink physical channels and downlink physical signals (including reservation signal) and transmit them via transmission antennas 1331. The UL receiver 1333 may receive multiplexed uplink physical channels and uplink physical signals via receiving antennas 1331 and de-multiplex them. The PUCCH receiver 1335 may provide the higher layer processor 1323 UCI. The PUSCH receiver 1337 may provide the higher layer processor 1323 received transport blocks.

Figure 14:
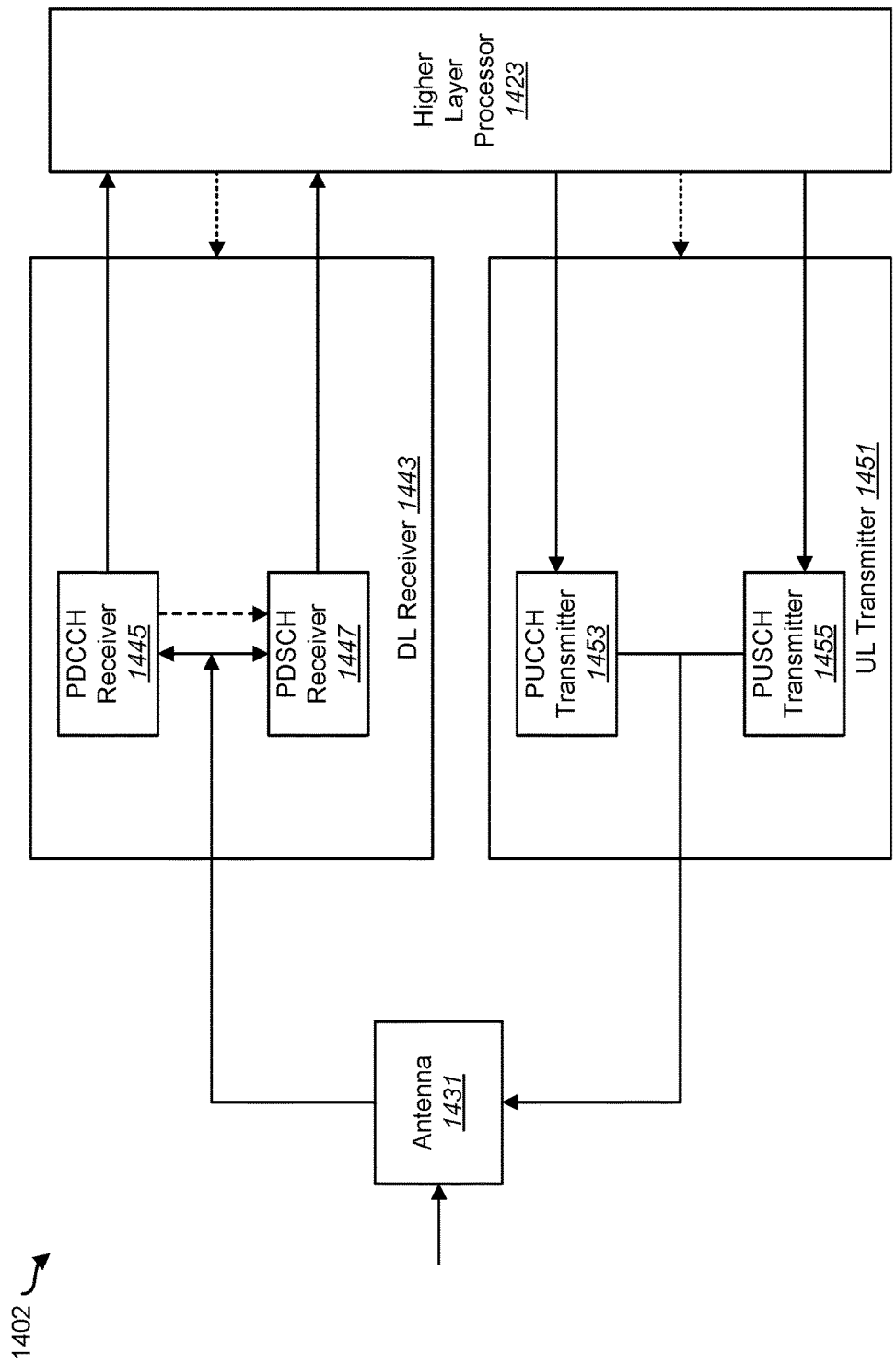
FIG. 14 is a block diagram illustrating one implementation of a UE.

FIG. 14 is a block diagram illustrating one implementation of a UE 1402. The UE 1402 may include a higher layer processor 1423, a UL transmitter 1451, a DL receiver 1443, and one or more antenna 1431. The UL transmitter 1451 may include a PUCCH transmitter 1453 and a PUSCH transmitter 1455. The DL receiver 1443 may include a PDCCH receiver 1445 and a PDSCH receiver 1447.

The higher layer processor 1423 may manage physical layer's behaviors (the UL transmitter's and the DL receiver's behaviors) and provide higher layer parameters to the physical layer. The higher layer processor 1423 may obtain transport blocks from the physical layer. The higher layer processor 1423 may send/acquire higher layer messages such as an RRC message and MAC message to/from a UE's higher layer. The higher layer processor 1423 may provide the PUSCH transmitter transport blocks and provide the PUCCH transmitter 1453 UCI.

The DL receiver 1443 may receive multiplexed downlink physical channels and downlink physical signals via receiving antennas 1431 and de-multiplex them. The PDCCH receiver 1445 may provide the higher layer processor 1423 DCI. The PDSCH receiver 1447 may provide the higher layer processor 1423 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 15:
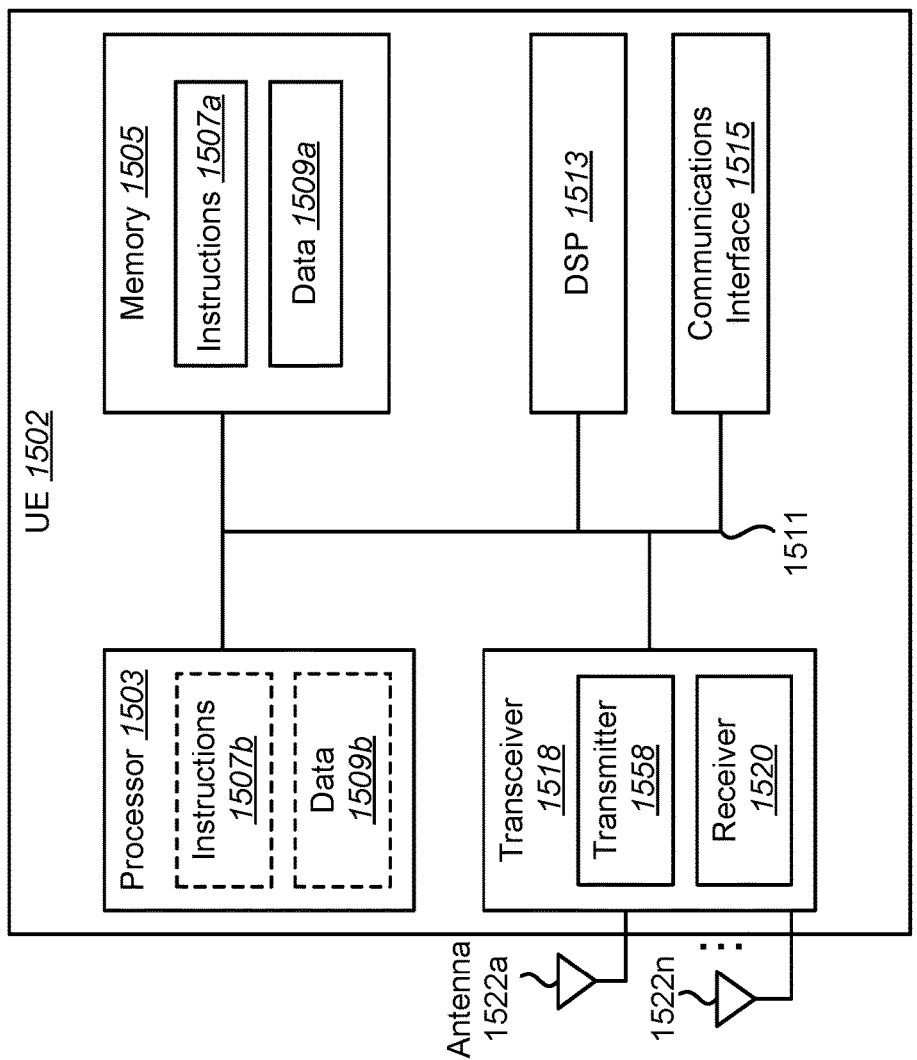
FIG. 15 illustrates various components that may be utilized in a UE.

FIG. 15 illustrates various components that may be utilized in a UE 1502. The UE 1502 described in connection with FIG. 15 may be implemented in accordance with the UE 102 described in connection with FIG. 1. The UE 1502 includes a processor 1503 that controls operation of the UE 1502. The processor 1503 may also be referred to as a central processing unit (CPU). Memory 1505, which may include read-only memory (ROM), random access memory (RAM), a combination of the two or any type of device that may store information, provides instructions 1507a and data 1509a to the processor 1503. A portion of the memory 1505 may also include non-volatile random access memory (NVRAM). Instructions 1507b and data 1509b may also reside in the processor 1503. Instructions 1507b and/or data 1509b loaded into the processor 1503 may also include instructions 1507a and/or data 1509a from memory 1505 that were loaded for execution or processing by the processor 1503. The instructions 1507b may be executed by the processor 1503 to implement the methods described above.

The UE 1502 may also include a housing that contains one or more transmitters 1558 and one or more receivers 1520 to allow transmission and reception of data. The transmitter(s) 1558 and receiver(s) 1520 may be combined into one or more transceivers 1518. One or more antennas 1522a-n are attached to the housing and electrically coupled to the transceiver 1518.

The various components of the UE 1502 are coupled together by a bus system 1511, which may include a power bus, a control signal bus and a status signal bus, in addition to a data bus. However, for the sake of clarity, the various buses are illustrated in FIG. 15 as the bus system 1511. The UE 1502 may also include a digital signal processor (DSP) 1513 for use in processing signals. The UE 1502 may also include a communications interface 1515 that provides user access to the functions of the UE 1502. The UE 1502 illustrated in FIG. 15 is a functional block diagram rather than a listing of specific components.

Figure 16:
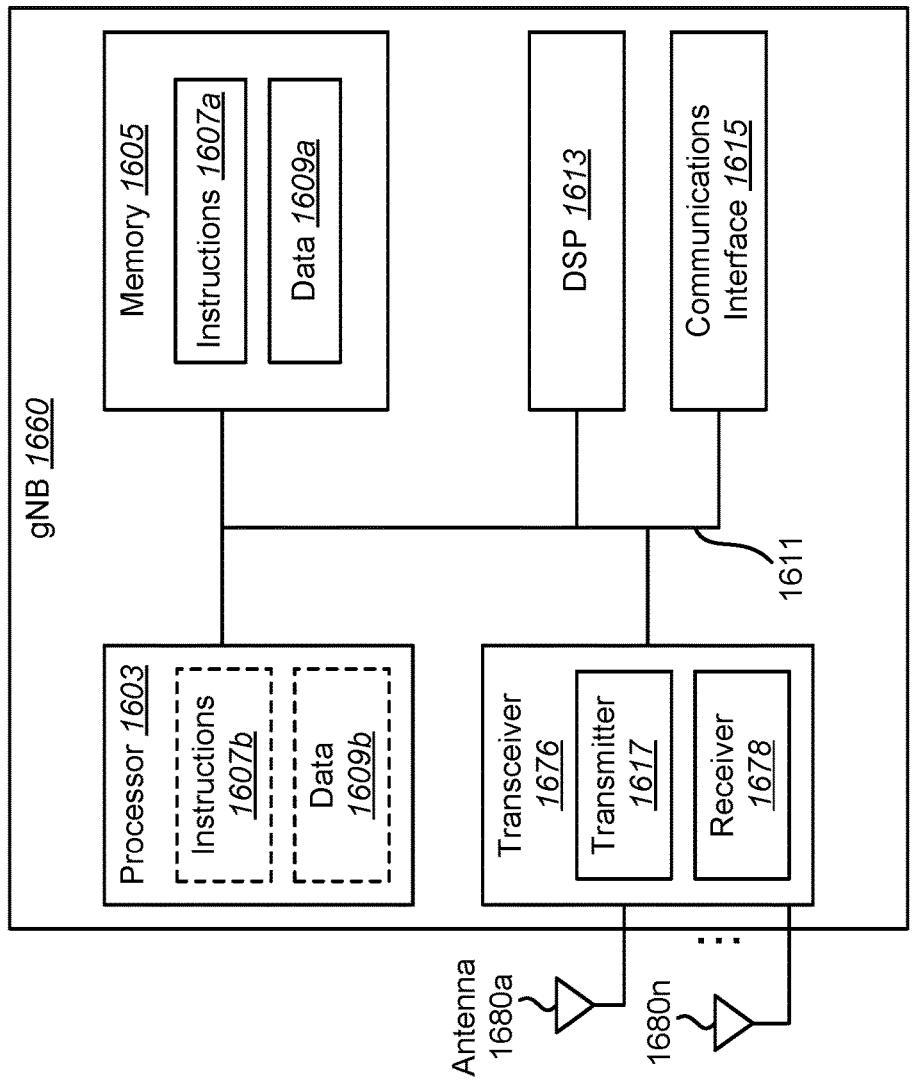
FIG. 16 illustrates various components that may be utilized in a gNB.

FIG. 16 illustrates various components that may be utilized in a gNB 1660. The gNB 1660 described in connection with FIG. 16 may be implemented in accordance with the gNB 160 described in connection with FIG. 1. The gNB 1660 includes a processor 1603 that controls operation of the gNB 1660. The processor 1603 may also be referred to as a central processing unit (CPU). Memory 1605, which may include read-only memory (ROM), random access memory (RAM), a combination of the two or any type of device that may store information, provides instructions 1607a and data 1609a to the processor 1603. A portion of the memory 1605 may also include non-volatile random access memory (NVRAM). Instructions 1607b and data 1609b may also reside in the processor 1603. Instructions 1607b and/or data 1609b loaded into the processor 1603 may also include instructions 1607a and/or data 1609a from memory 1605 that were loaded for execution or processing by the processor 1603. The instructions 1607b may be executed by the processor 1603 to implement the methods described above.

The gNB 1660 may also include a housing that contains one or more transmitters 1617 and one or more receivers 1678 to allow transmission and reception of data. The transmitter(s) 1617 and receiver(s) 1678 may be combined into one or more transceivers 1676. One or more antennas 1680a-n are attached to the housing and electrically coupled to the transceiver 1676.

The various components of the gNB 1660 are coupled together by a bus system 1611, which may include a power bus, a control signal bus and a status signal bus, in addition to a data bus. However, for the sake of clarity, the various buses are illustrated in FIG. 16 as the bus system 1611. The gNB 1660 may also include a digital signal processor (DSP) 1613 for use in processing signals. The gNB 1660 may also include a communications interface 1615 that provides user access to the functions of the gNB 1660. The gNB 1660 illustrated in FIG. 16 is a functional block diagram rather than a listing of specific components.

Figure 17:
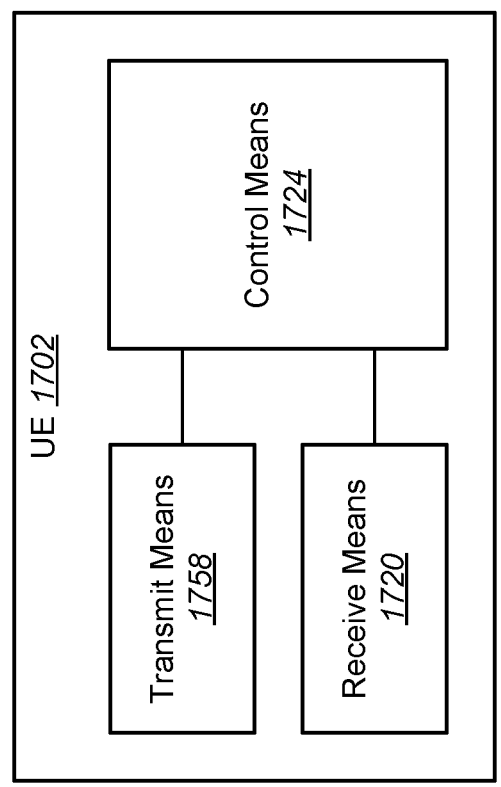
FIG. 17 is a block diagram illustrating one implementation of a UE in which systems and methods for ultra-reliable and low-latency communication operations may be implemented.

FIG. 17 is a block diagram illustrating one implementation of a UE 1702 in which systems and methods for ultra-reliable and low-latency communication operations may be implemented. The UE 1702 includes transmit means 1758, receive means 1720 and control means 1724. The transmit means 1758, receive means 1720 and control means 1724 may be configured to perform one or more of the functions described in connection with FIG. 1 above. FIG. 15 above illustrates one example of a concrete apparatus structure of FIG. 17. Other various structures may be implemented to realize one or more of the functions of FIG. 1. For example, a DSP may be realized by software.

Figure 18:
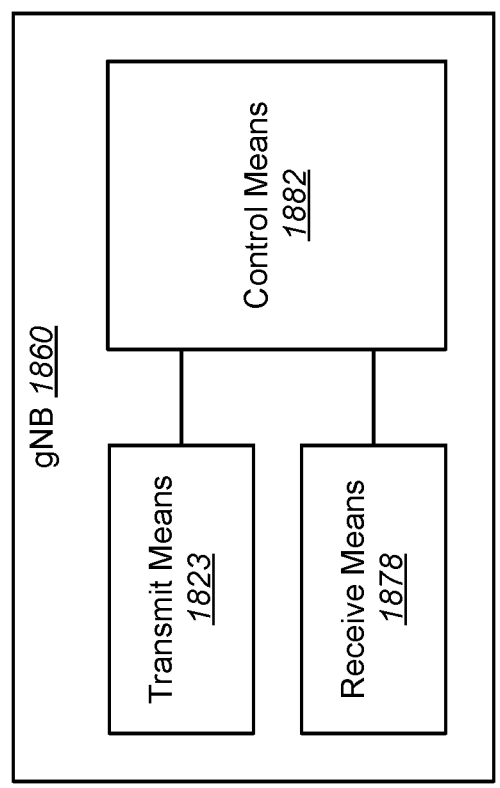
FIG. 18 is a block diagram illustrating one implementation of a gNB in which systems and methods for ultra-reliable and low-latency communication operations may be implemented.

FIG. 18 is a block diagram illustrating one implementation of a gNB 1860 in which systems and methods for ultra-reliable and low-latency communication operations may be implemented. The gNB 1860 includes transmit means 1817, receive means 1878 and control means 1882. The transmit means 1817, receive means 1878 and control means 1882 may be configured to perform one or more of the functions described in connection with FIG. 1 above. FIG. 16 above illustrates one example of a concrete apparatus structure of FIG. 18. Other various structures may be implemented to realize one or more of the functions of FIG. 1. For example, a DSP may be realized by software.

Figure 19:
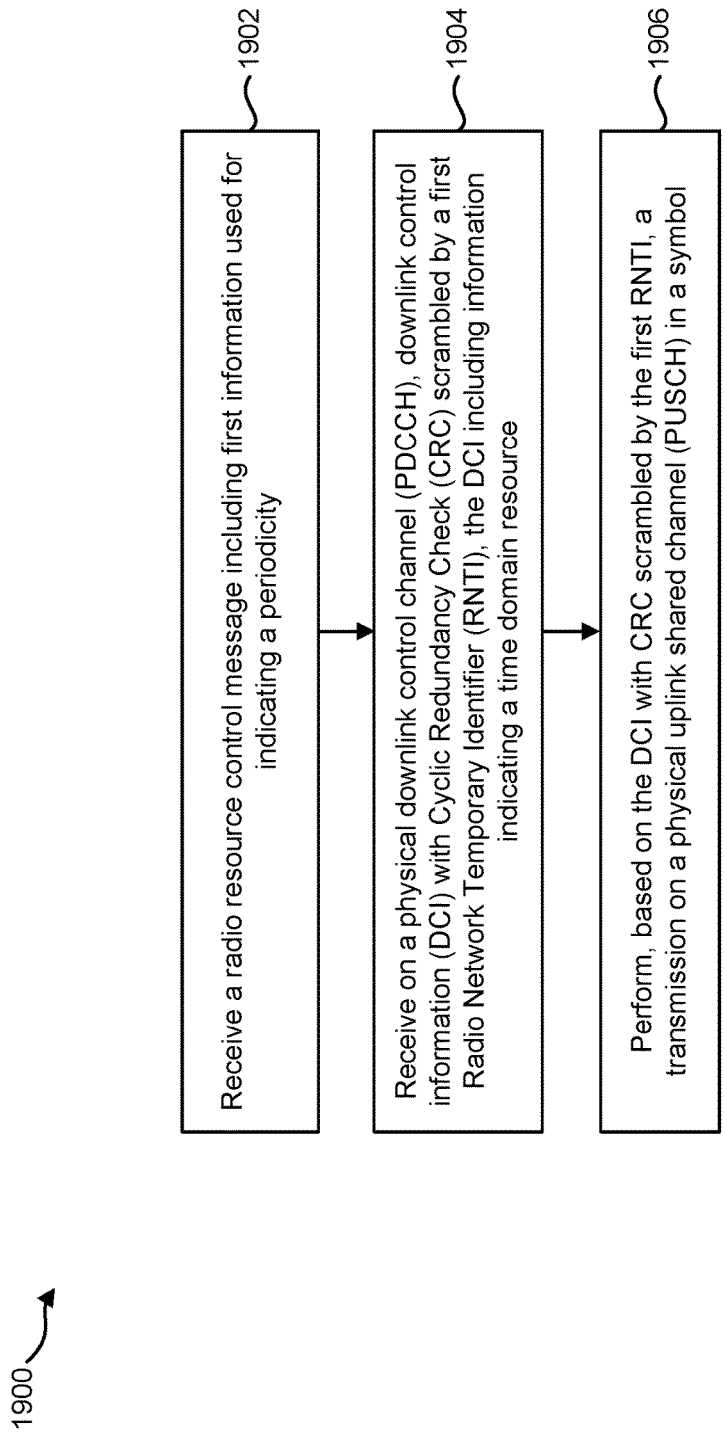
FIG. 19 is a flow diagram illustrating a communication method of a UE that communicates with a gNB.

FIG. 19 is a flow diagram illustrating a communication method 1900 of a user equipment (UE) 102 that communicates with a base station apparatus (gNB) 160. The UE 102 may receive 1902 a radio resource control message including first information used for indicating a periodicity. The UE 102 may receive 1904 on a physical downlink control channel (PDCCH), downlink control information (DCI) with Cyclic Redundancy Check (CRC) scrambled by a first Radio Network Temporary Identifier (RNTI), the DCI including information indicating a time domain resource. The UE 102 may perform 1906, based on the DCI with CRC scrambled by the first RNTI, a transmission on a physical uplink shared channel (PUSCH) in a symbol. The time domain resource may include an index of the symbol in which the transmission on the PUSCH is performed and a slot offset value. The index of the symbol in which the transmission on the PUSCH is performed may be within a slot given by the first information and the slot offset value.

The UE 102 may also receive a radio resource control message including a first parameter. The UE 102 may further receive a radio resource control message including a second parameter. The UE 102 may additionally receive on the PDCCH, DCI with CRC scrambled by a second RNTI, the DCI being used for scheduling of the PUSCH. The UE 102 may transmit a demodulation reference signal (DMRS) for the PUSCH. In a case that the transmission on the PUSCH is performed based on the DCI with CRC scrambled by the first RNTI, the DMRS for the PUSCH is generated based on the first parameter. In a case that a transmission on the PUSCH is performed based on the DCI with CRC scrambled by the second RNTI, the DMRS for the PUSCH is generated based on the second parameter.

Figure 20:
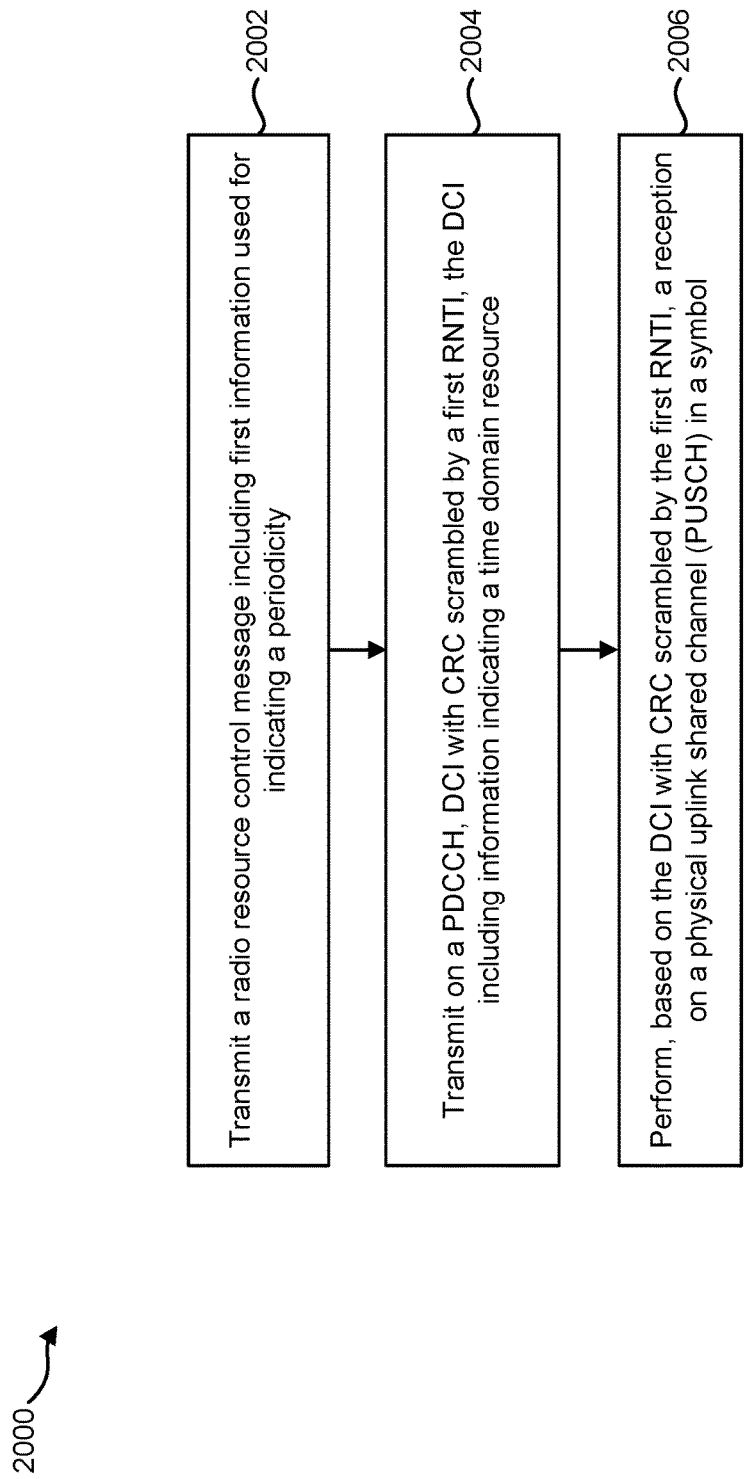
FIG. 20 is a flow diagram illustrating a communication method of a gNB that communicates with a UE.

FIG. 20 is a flow diagram illustrating a communication method 2000 of a base station apparatus (gNB) 160 that communicates with a user equipment (UE) 102. The gNB 160 may transmit 2002 a radio resource control message including first information used for indicating a periodicity. The gNB 160 may transmit 2004 on a PDCCH, DCI with CRC scrambled by a first RNTI, the DCI including information indicating a time domain resource. The gNB 160 may perform 2006, based on the DCI with CRC scrambled by the first RNTI, a reception on a physical uplink shared channel (PUSCH) in a symbol. The time domain resource may include an index of the symbol in which the reception on the PUSCH is performed and a slot offset value. The index of the symbol in which the reception on the PUSCH is performed may be within a slot given by the first information and the slot offset value.

The gNB 160 may transmit a radio resource control message including a first parameter. The gNB 160 may transmit a radio resource control message including a second parameter. The gNB 160 may transmit on the PDCCH, DCI with CRC scrambled by a second RNTI, the DCI being used for scheduling of the PUSCH. The gNB 160 may receive a demodulation reference signal (DMRS) for the PUSCH. In a case that the reception on the PUSCH is performed based on the DCI with CRC scrambled by the first RNTI, the DMRS for the PUSCH is received based on the first parameter. In a case that a reception on the PUSCH is performed based on the DCI with CRC scrambled by the second RNTI, the DMRS for the PUSCH is received based on the second parameter.

Figure 21:
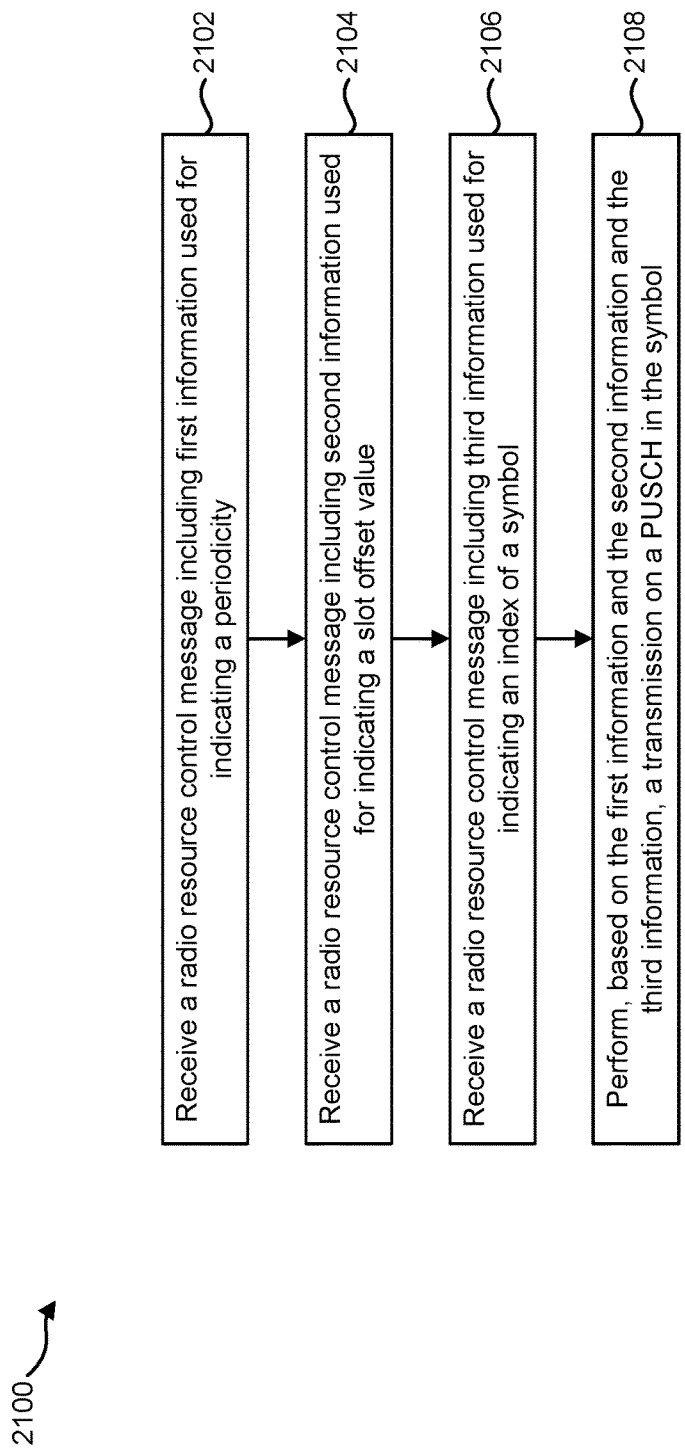
FIG. 21 is a flow diagram illustrating another communication method of a UE that communicates with a gNB.

FIG. 21 is a flow diagram illustrating another communication method 2100 of a user equipment (UE) 102 that communicates with a base station apparatus (gNB) 160. The UE 102 may receive 2102 a radio resource control message including first information used for indicating a periodicity. The UE 102 may receive 2104 a radio resource control message including second information used for indicating a slot offset value. The UE 102 may receive 2106 a radio resource control message including third information used for indicating an index of a symbol. The UE 102 may perform 2108, based on the first information and the second information and the third information, a transmission on a physical uplink shared channel (PUSCH) in the symbol. The index of the symbol in which the transmission on the PUSCH is performed may be within a slot given by the first information and the second information.

Figure 22:
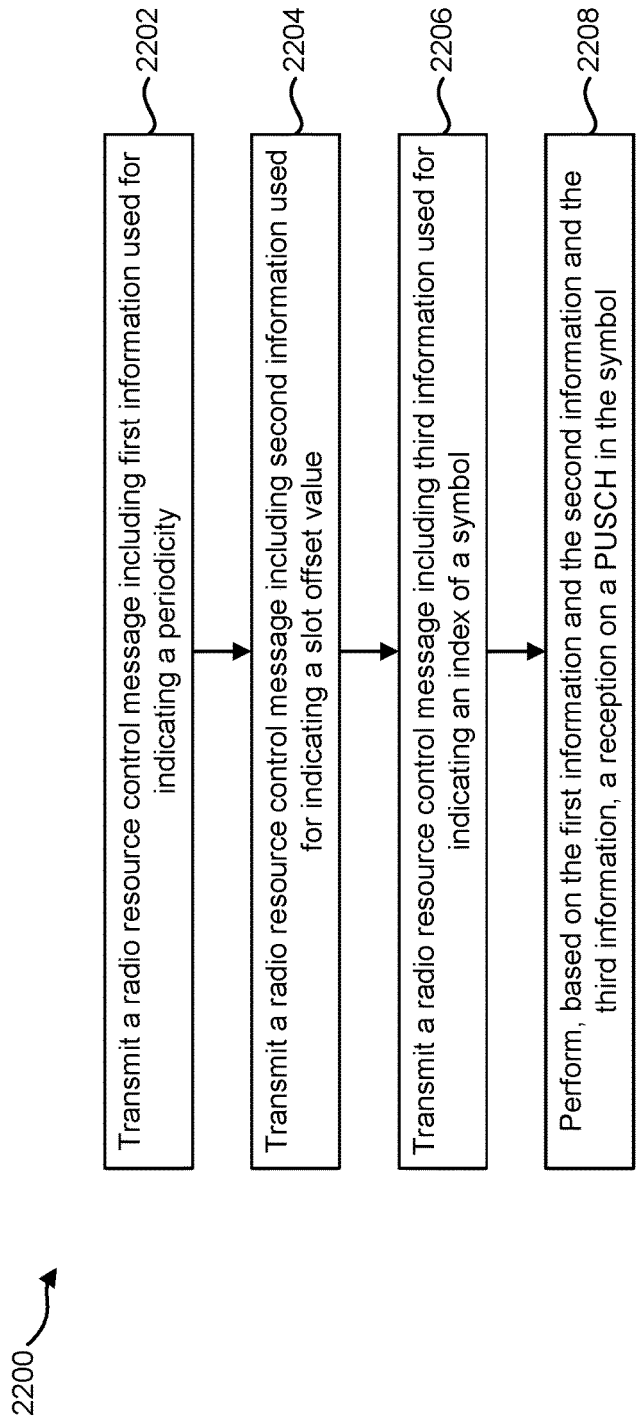
FIG. 22 is a flow diagram illustrating another communication method of a gNB that communicates with a UE.

FIG. 22 is a flow diagram illustrating another communication method 2200 of a base station apparatus (gNB) 160 that communicates with a user equipment (UE) 102. The gNB 160 may transmit 2202 a radio resource control message including first information used for indicating a periodicity. The gNB 160 may transmit 2204 a radio resource control message including second information used for indicating a slot offset value. The gNB 160 may transmit 2206 a radio resource control message including third information used for indicating an index of a symbol. The gNB 160 may perform 2208, based on the first information and the second information and the third information, a reception on a physical uplink shared channel (PUSCH) in the symbol. The index of the symbol in which the reception on the PUSCH is performed may be within a slot given by the first information and the second information.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A terminal apparatus that communicates with a base station apparatus comprising:
   receiving circuitry configured to receive a radio resource control message comprising first information used for indicating a periodicity,
   the receiving circuitry configured to receive, a downlink control information (DCI) format with Cyclic Redundancy Check (CRC) scrambled by a first Radio Network Temporary Identifier (RNTI) which is different from a cell-RNTI (C-RNTI), the DCI format comprising second information; and
   transmitting circuitry configured to perform, based on the first information and the DCI format with the CRC scrambled by the first RNTI, a transmission on a physical uplink shared channel (PUSCH) in a symbol within a slot, wherein
   an index of the symbol in which the transmission on the PUSCH is performed is indicated by the second information, and
   an index of the slot in which the transmission on the PUSCH is performed is derived based on a timing relationship between the DCI format and the PUSCH, which is indicated by the second information.

2. A terminal apparatus that communicates with a base station apparatus comprising:
   receiving circuitry configured to receive a radio resource control message including first information used for indicating a periodicity,
   the receiving circuitry configured to receive a radio resource control message including second information used for indicating a slot offset value,
   the receiving circuitry configured to receive a radio resource control message including third information used for indicating an index of a symbol; and
   transmitting circuitry configured to perform, based on the first information, the second information and the third information, a transmission on a physical uplink shared channel (PUSCH) in the symbol, wherein
   the index of the symbol in which the transmission on the PUSCH is performed is within a slot given by the first information and the second information.

3. A base station apparatus that communicates with a terminal apparatus comprising:
   transmitting circuitry configured to transmit a radio resource control message comprising first information used for indicating a periodicity,
   the transmitting circuitry configured to transmit, a downlink control information (DCI) format with Cyclic Redundancy Check (CRC) scrambled by a first Radio Network Temporary Identifier (RNTI) which is different from a cell-RNTI (C-RNTI), the DCI format comprising second information; and
   receiving circuitry configured to perform, based on the first information and the DCI format with the CRC scrambled by the first RNTI, a reception on a physical uplink shared channel (PUSCH) in a symbol within a slot, wherein
   an index of the symbol in which the reception on the PUSCH is performed is indicated by the second information, and
   an index of the slot in which the reception on the PUSCH is performed is derived based on a timing relationship between the DCI format and the PUSCH, which is indicated by the second information.

4. A base station apparatus that communicates with a terminal apparatus comprising:
   transmitting circuitry configured to transmit a radio resource control message including first information used for indicating a periodicity,
   the transmitting circuitry configured to transmit a radio resource control message including second information used for indicating a slot offset value,
   the transmitting circuitry configured to transmit a radio resource control message including third information used for indicating an index of a symbol; and
   receiving circuitry configured to perform, based on the first information and the second information and the third information, a reception on a physical uplink shared channel (PUSCH) in the symbol, wherein
   the index of the symbol in which the reception on the PUSCH is performed is within a slot given by the first information and the second information.

5. A communication method of a terminal apparatus that communicates with a base station apparatus comprising:
   receiving a radio resource control message comprising first information used for indicating a periodicity;
   receiving, a downlink control information (DCI) format with Cyclic Redundancy Check (CRC) scrambled by a first Radio Network Temporary Identifier (RNTI) which is different from a cell-RNTI (C-RNTI), the DCI format comprising second information; and
   performing, based on the first information and the DCI format with the CRC scrambled by the first RNTI, a transmission on a physical uplink shared channel (PUSCH) in a symbol within a slot, wherein
   an index of the symbol in which the transmission on the PUSCH is performed is indicated by the second information, and
   an index of the slot in which the transmission on the PUSCH is performed is derived based on a timing relationship between the DCI format and the PUSCH, which is indicated by the second information.

6. A communication method of a base station apparatus that communicates with a terminal apparatus comprising:
   transmitting a radio resource control message comprising first information used for indicating a periodicity;
   transmitting, a downlink control information (DCI) format with Cyclic Redundancy Check (CRC) scrambled by a first Radio Network Temporary Identifier (RNTI) which is different from a cell-RNTI (C-RNTI), the DCI format comprising second information; and
   performing, based on the first information and the DCI format with the CRC scrambled by the first RNTI, a reception on a physical uplink shared channel (PUSCH) in a symbol within a slot, wherein an index of the symbol in which the reception on the PUSCH is performed is indicated by the second information, and an index of the slot in which the reception on the PUSCH is performed is derived based on a timing relationship between the DCI format and the PUSCH, which is indicated by the second information.

* * * * *